US008221668B2

(12) United States Patent
DiNello et al.

(10) Patent No.: US 8,221,668 B2
(45) Date of Patent: Jul. 17, 2012

(54) PROCESS FOR FORMING PLASTIC, APPARATUSES FOR FORMING PLASTIC, AND ARTICLES MADE THEREFROM

(75) Inventors: Panfilo M. DiNello, Cinton Township, MI (US); Miguel A. Linares, Bloomfield Hills, MI (US); Lynn E. Cargill, Mt. Clemens, MI (US); Robin L. Pointer, Saint Clair Shores, MI (US); Paul A. Haines, Piqua, OH (US)

(73) Assignee: Environmental Recycling Technologies, Plc, Oxon (GB)

( * ) Notice: Subject to any disclaimer, the term of this patent is extended or adjusted under 35 U.S.C. 154(b) by 923 days.

(21) Appl. No.: 10/239,039

(22) PCT Filed: Feb. 5, 2002

(86) PCT No.: PCT/US02/03298
§ 371 (c)(1),
(2), (4) Date: Jun. 20, 2005

(87) PCT Pub. No.: WO02/062550
PCT Pub. Date: Aug. 15, 2002

(65) Prior Publication Data
US 2006/0003044 A1     Jan. 5, 2006

Related U.S. Application Data

(60) Provisional application No. 60/270,321, filed on Feb. 5, 2001, provisional application No. 60/300,874, filed on Jun. 25, 2001, provisional application No. 60/346,336, filed on Jan. 7, 2002.

(51) Int. Cl.
*B29C 43/52* (2006.01)

(52) U.S. Cl. ....................................................... 264/279
(58) Field of Classification Search .................. 264/279, 264/270, 302, 305, 304
See application file for complete search history.

(56) References Cited

U.S. PATENT DOCUMENTS

| 2,000,557 A | 5/1935 | Buczkowski |
| 2,744,360 A | 5/1956 | Collini |
| 2,950,505 A | 8/1960 | Frank |
| 3,312,761 A | 4/1967 | Vida |

(Continued)

FOREIGN PATENT DOCUMENTS

DE     880065     6/1953

(Continued)

*Primary Examiner* — Christina Johnson
*Assistant Examiner* — Xue Liu
(74) *Attorney, Agent, or Firm* — Cargill & Associates, PLLC; Lynn E. Cargill

(57) ABSTRACT

Process and apparatus for forming plastics by heating an open mold and contacting the open mold with plastic particulate material to form a melted skin on the mold, and resulting articles made therefrom. Single skin molded articles may be multi-layered with or without paint on the surface. Multiple skin molded articles may be made by complementary male and female molds, brought together after the skins are made on the individual male and female molds, and may include sandwiched layers of plastic filler or expandable foam filled centers, with or without various inserts or reinforcements. Multi-layer composite articles are made with inserts and/or reinforcements that may be embedded in and surrounded by expandable foam plastic, if used as a middle layer. Resulting articles include a pick-up truck bed box, an industrial tabletop, a series of modular housing panels, an airplane cockpit door, and material handling pallets, among others.

12 Claims, 11 Drawing Sheets

U.S. PATENT DOCUMENTS

| | | | |
|---|---|---|---|
| 3,387,077 A | 6/1968 | Sammons et al. |
| 3,414,642 A | 12/1968 | Baum |
| 3,493,257 A | 2/1970 | Fitzgerald et al. |
| 3,646,181 A | 2/1972 | Galla |
| 3,773,875 A | 11/1973 | Lammers |
| 3,787,544 A | 1/1974 | Barnette |
| 3,815,657 A | 6/1974 | Malek et al. |
| 3,872,199 A | 3/1975 | Ottinger |
| 3,906,071 A | 9/1975 | Cook et al. |
| 3,932,107 A | 1/1976 | Proudfit |
| 3,969,475 A | 7/1976 | Horiuchi et al. |
| 3,981,852 A | 9/1976 | Manwiller et al. |
| 4,049,767 A | 9/1977 | Vaidya |
| 4,096,219 A | 6/1978 | Mollenbruck et al. |
| 4,105,734 A | 8/1978 | Nakagawa |
| 4,167,382 A | 9/1979 | Freedman et al. |
| 4,238,537 A | 12/1980 | Kerr |
| 4,244,993 A | 1/1981 | Platka, III et al. |
| 4,251,476 A | 2/1981 | Smith |
| 4,261,473 A | 4/1981 | Yamada et al. |
| 4,431,397 A | 2/1984 | Fried et al. |
| 4,457,729 A | 7/1984 | Peerlkamp |
| 4,477,400 A | 10/1984 | Peerlkamp |
| 4,520,170 A | 5/1985 | Kitto |
| 4,548,779 A | 10/1985 | Steinberg et al. |
| 4,554,118 A | 11/1985 | Seifert |
| 4,562,025 A | 12/1985 | Gray |
| 4,596,841 A | 6/1986 | Konishi et al. |
| 4,634,360 A | 1/1987 | Gray |
| 4,664,864 A | 5/1987 | Wersosky |
| 4,668,535 A | 5/1987 | Liggett et al. |
| 4,677,148 A | 6/1987 | Chung et al. |
| 4,681,712 A | 7/1987 | Sakakibara et al. |
| 4,692,293 A | 9/1987 | Gray |
| 4,722,678 A | 2/1988 | Wersosky |
| 4,755,245 A | 7/1988 | Viel |
| 4,773,844 A | 9/1988 | Bartels |
| 4,799,873 A | 1/1989 | Martin |
| 4,800,116 A | 1/1989 | Ventimiglia et al. |
| 4,836,767 A | 6/1989 | Schad et al. |
| 4,878,827 A | 11/1989 | Muller |
| 4,900,489 A | 2/1990 | Nagase et al. |
| 4,952,358 A | 8/1990 | Okina et al. |
| 5,059,362 A | 10/1991 | Tsuchihashi |
| 5,066,449 A | 11/1991 | Kato et al. |
| 5,154,478 A | 10/1992 | Erickson et al. |
| 5,219,919 A | 6/1993 | Ando et al. |
| 5,221,507 A | 6/1993 | Beck et al. |
| 5,244,608 A | 9/1993 | Andersen |
| 5,254,298 A | 10/1993 | Ibar |
| 5,262,103 A | 11/1993 | LaPoint |
| 5,284,607 A | 2/1994 | Chen |
| 5,284,938 A | 2/1994 | Dangayach et al. |
| 5,288,549 A | 2/1994 | Zeitler et al. |
| 5,308,700 A | 5/1994 | Hikasa et al. |
| 5,344,183 A | 9/1994 | Hersman et al. |
| 5,346,660 A | 9/1994 | Matsumoto |
| 5,378,416 A | 1/1995 | Kishi et al. |
| 5,437,820 A | 8/1995 | Brotz |
| 5,453,234 A | 9/1995 | Gusik |
| 5,470,900 A | 11/1995 | Sasaki et al. |
| 5,482,761 A | 1/1996 | Palumbo et al. |
| 5,492,663 A | 2/1996 | Greenwald et al. |
| 5,512,233 A | 4/1996 | Gallagher et al. |
| 5,556,498 A | 9/1996 | Blanchard |
| 5,569,474 A | 10/1996 | Kitaichi et al. |
| 5,580,514 A | 12/1996 | Farley |
| 5,585,431 A | 12/1996 | Igarashi et al. |
| 5,620,636 A * | 4/1997 | Kawai et al. ................. 264/45.4 |
| 5,647,410 A | 7/1997 | Nakagawa et al. |
| 5,665,285 A | 9/1997 | Hattori et al. |
| 5,683,637 A | 11/1997 | Morioka et al. |
| 5,696,201 A | 12/1997 | Cavalloni et al. |
| 5,711,910 A | 1/1998 | Kostrivas et al. |
| 5,762,972 A | 6/1998 | Byon |
| 5,783,611 A | 7/1998 | Strebel |
| 5,824,246 A | 10/1998 | Reetz |
| 5,833,805 A | 11/1998 | Emery |
| 5,837,183 A | 11/1998 | Inoue et al. |
| 5,858,508 A | 1/1999 | Sturtevant et al. |
| 5,885,507 A | 3/1999 | Hendrikus |
| 5,891,377 A | 4/1999 | Libres et al. |
| 5,898,048 A | 4/1999 | Yamaguchi et al. |
| 5,900,196 A * | 5/1999 | Cittadini et al. ............. 264/46.5 |
| 5,906,782 A | 5/1999 | Blanchard et al. |
| 5,945,200 A | 8/1999 | Suzuki |
| 5,950,627 A | 9/1999 | Bologovsky et al. |
| 5,994,499 A | 11/1999 | Asano et al. |
| 6,008,281 A | 12/1999 | Yang et al. |
| 6,013,684 A | 1/2000 | Suzuki et al. |
| 6,022,509 A | 2/2000 | Matthews et al. |
| 6,042,774 A | 3/2000 | Wilkening et al. |
| 6,086,813 A | 7/2000 | Gruenwald |
| 6,099,782 A | 8/2000 | Holmes |
| 6,103,153 A | 8/2000 | Park et al. |
| 6,162,383 A | 12/2000 | Hane et al. |
| 6,171,360 B1 | 1/2001 | Suzuki et al. |
| 6,196,634 B1 | 3/2001 | Jurinek |
| 6,214,272 B1 | 4/2001 | Gruenwald et al. |
| 6,217,975 B1 | 4/2001 | Daton-Lovett |
| 6,224,797 B1 | 5/2001 | Franzen et al. |
| 6,224,816 B1 | 5/2001 | Hull et al. |
| 6,231,798 B1 | 5/2001 | Matsumoto et al. |
| 6,235,229 B1 | 5/2001 | Beck et al. |
| 6,241,935 B1 | 6/2001 | Beane et al. |
| 6,242,090 B1 | 6/2001 | Green et al. |
| 6,258,305 B1 | 7/2001 | Brinker et al. |
| 6,264,462 B1 | 7/2001 | Gallagher |
| 6,280,551 B1 | 8/2001 | Hilligoss |
| 6,281,281 B1 | 8/2001 | Asano et al. |
| 6,284,182 B1 | 9/2001 | McNally |
| 6,284,183 B1 | 9/2001 | Roys et al. |
| 6,299,817 B1 | 10/2001 | Parkinson |
| 2001/0020757 A1 | 9/2001 | Fried et al. |

FOREIGN PATENT DOCUMENTS

| | | |
|---|---|---|
| DE | 1271379 | 6/1968 |
| DE | 2109934 | 9/1972 |
| DE | 004215914 A1 | 11/1993 |
| EP | 0 286 058 A2 | 10/1988 |
| EP | 0540941 | 5/1993 |
| EP | 0679488 | 11/1995 |
| FR | 002702989 A1 | 9/1994 |
| GB | 1337962 | 11/1973 |
| GB | 1337962 A | 11/1973 |
| GB | 1384433 | 2/1975 |
| JP | 55002029 | 1/1980 |
| JP | 355049235 A | 4/1980 |
| JP | 62046611 | 2/1987 |
| JP | 63-82729 | 4/1988 |
| JP | 2-127037 | 5/1990 |
| JP | 405318611 A | 12/1993 |
| JP | 07024857 | 1/1995 |
| WO | WO 97/38839 | 10/1997 |

* cited by examiner

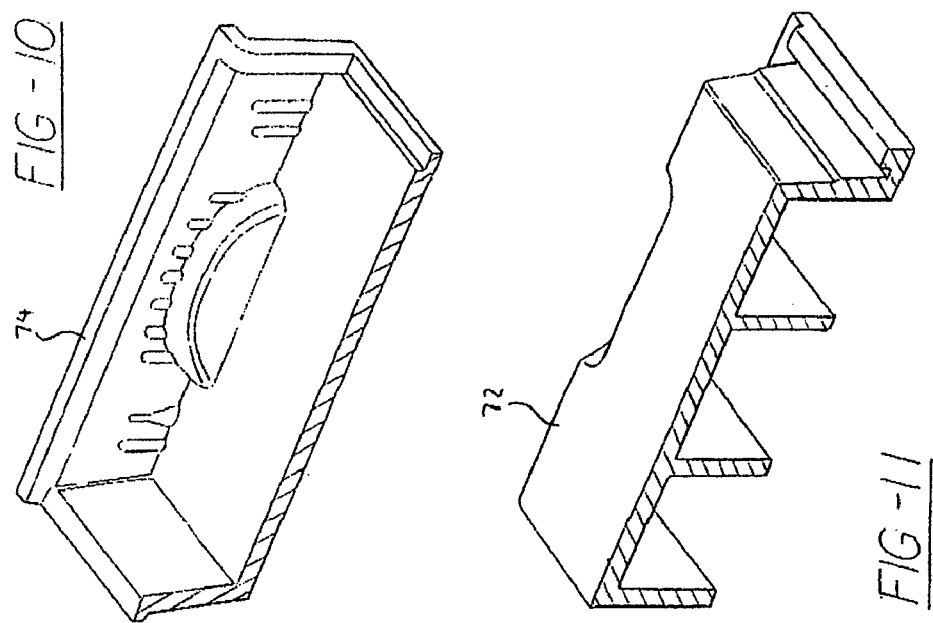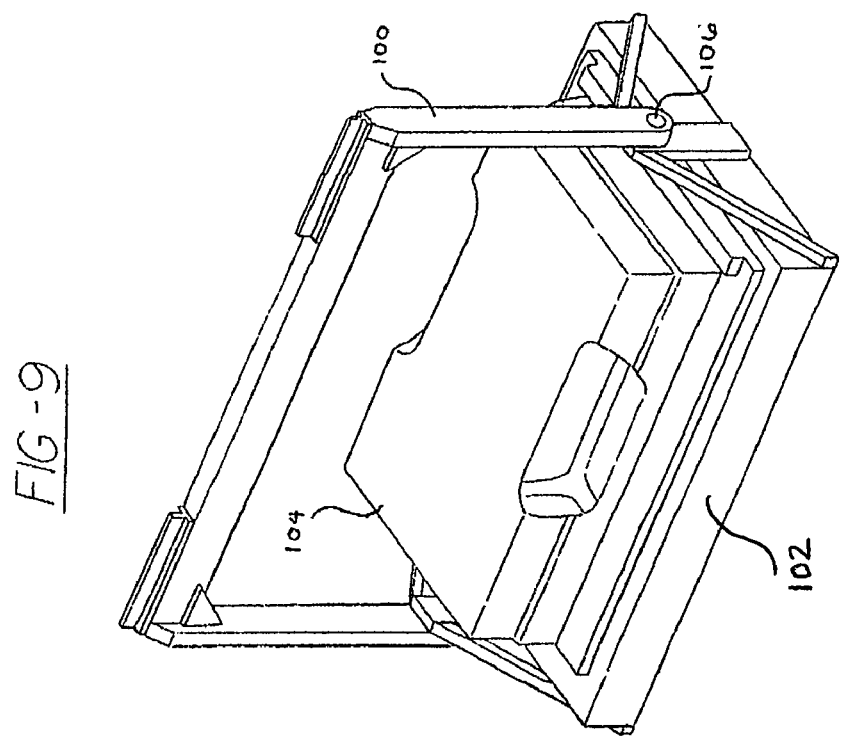

PROCESS FOR FORMING PLASTIC, APPARATUSES FOR FORMING PLASTIC, AND ARTICLES MADE THEREFROM

CROSS REFERENCES TO RELATED APPLICATIONS

This application claims the benefit of U.S. Provisional Application No. 60/270,321 filed on Feb. 5, 2001, U.S. Provisional Application No. 60/300,874 filed on Jun. 25, 2001, and U.S. Provisional Application No. 60/346,336 filed on Jan. 7, 2002.

BACKGROUND OF THE INVENTION

This patent application generally relates to the forming of plastic and, more specifically, relates to the forming of plastic using a heated mold in contact with plastic particles, whether they be in the form of powder, resins, pellets or the like.

Although conventional methods of forming plastics are good, there is always room for improvement. There are many ways to make plastics, but there are few ways to make plastic articles which are lightweight, strong, fire retardant, bullet proof, insulative, impact resistant, as well as having a decorative, textured or functional skin, or made with plastic in a single layer on a heated mold. Furthermore, there are few ways taught in the prior art of embedding articles within the plastic, in order to either reinforce the article or to change its properties. Moreover, there are even fewer ways known in the art for including various materials throughout the body of an article without having seams, including multiple layer structures and various materials dispersed throughout the surface of the article.

Although it is known to put inserts into injection molded plastic articles, the present inventors do not know of any other low temperature, low pressure methods which can completely suspend an insert, reinforcement, foam core or other sandwiched material within the plastic material itself. It would be advantageous for such a method of forming plastic, as well as one to utilize such relatively low temperatures, ambient pressures and the ability to use inexpensive and easily machined molds which will last for an entire production of an article. Of course, it would also be advantageous for such a method to be capable of using recycled materials.

Such a new method of forming plastic would be usable for a huge multitude of applications, including, but certainly not limited to: automotive and industrial vehicle components; modular housing panels; airplane components; consumer and industrial furniture such as tables, tabletops and the like; doors; windows; material handling pallets and other articles; consumer goods; industrial articles; marine applications and boat hulls; molds and components, including seawalls, boat hulls and the like; medical apparatuses and other applications; scaffolding and other building construction articles; sea containers; railroad containers; composite wheels for trains, vehicles and food shipping containers including food containers of all sizes and shapes, just to name some of the applications. Each of these applications will include various forms of the plastic articles, including various materials sandwiched between two or more skins in order to produce the desired material properties.

One of the largest applications for the present invention and technology is the creation of automobile vehicle components, including pick-up truck boxes, roof components, underbody components, and the like. In an industry which traditionally used steel for its components, the automotive vehicle manufacturers in Detroit and abroad are seeking lightweight plastic components for their vehicles because the new stricter fuel economy regulations are forcing them to rethink how they manufacture vehicles. Environmentally friendly politicians in various governments, including Washington, D.C., are backing regulations which will press the automotive industry hard into developing more fuel-efficient vehicles. Currently, the best selling vehicles in the United States are heavy trucks and sport utility vehicles, all of which have poor fuel economy due to their massive size and incredibly high weights. For most of these vehicles that weigh 4,000 to 6,500 pounds, normal side roads with a gross weight limit of one and a half tons will crack under a sustained weight such as these vehicles.

The easiest way to achieve a more fuel-efficient vehicle is to reduce the weight. One way to reduce the weight is to remove various steel portions and replace them with lightweight, strong plastic, such as the topic of the present invention. The Corporate Average Fuel Economy, or "CAFE", is increasingly putting demands on the automotive industry because of the growing evidence of the vehicle pollution-caused greenhouse effect and other environmental maladies. The change to plastic components has huge implications for the American automotive industry which is already facing pinched profits and dented sales with the slow economy. The Big 3 automakers in the United States say that tougher mileage rules, particularly for sport utility vehicles, could cost each of the companies several billion dollars over the next few years and would seriously hurt their profits. In one answer to meeting the new CAFE standards, some of the automobile manufacturers have pledged to launch the new highly efficient hybrid vehicles, which are part electric and part gasoline having much lower pollution emissions.

However, it is widely acknowledged that the new hybrid technology alone will not suffice to achieve the CAFE standards which are on the horizon. Automakers admit that they will have to start selling many more lighter-weight vehicles, such as compact sport utility vehicles, to meet new fuel economy standards. Of the 11.4 million vehicles which Detroit automakers sold last year, 59 percent were trucks or SUVs. And of America's top ten best selling trucks, sport utility vehicles and mini-vans, all fall far short of the current gas standards, as measured by their combined average highway and city miles per gallon. The current CAFE standard for trucks is 20.7 miles per gallon, although most of the trucks and SUVs have fuel efficiencies from 13 mpg to 18 mpg.

As the advent of the electric hybrid vehicles are not the only solution to the automakers complying with CAFE standards, it becomes clear that improving gas mileage of sport utility vehicles and trucks is the easy target. It is an easy target because the SUVs and trucks are very heavy and they get the worst fuel economy of almost any vehicle on the road. For example, the Ford Motor Company's Excursion SUV only achieves 13 miles per gallon for city driving. The current predictions by Detroit automakers is that if the current proposed boosted truck standards of 24 mpg, at an increase of 3.3 miles per gallon from present 20.7 mpg standards, this would cause the automakers to lose sales of over 1 million large pick-ups and sport utilities. And, as always, the industry warns that they won't be the only one hurt. They say that the price added onto vehicles to make them more fuel-efficient will cost our economy close to 300,000 jobs. The standard solution in Japan to increasing the fuel mileage of vehicles is, industry wide, to improve small cars and their gas mileage, to sacrifice horse power at the expense of fuel efficiency, particularly for sport utility vehicles, to boost fuel-efficiency research and development in order to develop fuel-efficient engines for cars and SUVs, as well as to curb production of the largest SUVs which are the main culprits in lowering Detroit's average fuel efficiency for trucks.

Therefore, it would be of a great advantage to significantly reduce the weight of pick-up trucks and sport utility vehicles, thereby boosting the fuel economy and thereby alleviating the payment of fines for exceeding CAFE standards. It would be most advantageous, and most environmentally friendly, to make plastic vehicle components. Although the use of conventional plastics is a huge advancement, we may take this trend a step further by using biodegradable plastics or those made from renewable sources, such as the polylactic acid polymer being proposed by Cargill Dow and the National Renewable Energy Laboratory. The new corn-based biodegradable polymer is called polylactic acid (PLA), and may be utilized in various components of the present invention. Furthermore, plastics were made for automobiles as early as the 1920s by Henry Ford, from plastics made from the hemp plant.

In one prototype made in accordance with the present invention, a Dodge Dakota truck had its steel truck box bed replaced with a plastic truck box made in accordance with the present invention. The weight savings was 95 pounds. This is incredible considering the fact that Chrysler has been asking its suppliers to shave ounces off of the parts that they are supplying. To save nearly 100 pounds per vehicle will have an enormous effect on the gas consumption and fuel economy. Furthermore, due to the extreme light weight, a dump truck configuration is possible, as well as a scissors-jack man lift configuration. As an impact-resistant material may be utilized, the truck box bed can handle slow accidents with minimal damage to the pickup truck box. In addition, it would be of great advantage to be able to embed conduits and/or wire harnesses directly into the plastic truck box bed itself, thereby allowing a plug-in operation once the pickup truck box has been placed on the chaise. It would also be advantageous to provide a method for forming plastic for such a pickup truck box that would allow heavy metal components to extend therefrom in order to give a mounting device to the chaise of the vehicle, such as is possible with the present invention.

In yet another embodiment, it would be advantageous to be able to easily and inexpensively form modular housing panels which can be clipped together and caulked in place to make rapid housing. For instance, there are currently over 1.5 million Afghanistan refugees caused by war in their country. Other third-world nations would be excellent candidates for such modular housing components. There is a long felt need for a cheap, lightweight and inexpensive, insulated clip together housing component which can be manufactured on site, as well as manufactured in a plant back at a home base and then shipped to the location itself. As one may be aware, Rubbermaid Corporation of Ohio in the United States makes many little work sheds and garden sheds for use in a back yard, although these sheds are not suitable for human living conditions. However, those sheds are made by injection molding which does not lend itself well to even larger products, and the molds are extremely expensive for ones of that size to be used for production. It would be a great advantage to utilize very inexpensive molds, recycled materials and insulation which can be embedded within a plastic composite article such that a useful modular house can be made in a very short period of time.

It would further be useful to be able to embed conduits and/or electrical wires themselves directly into the plastic panels. Plug-in devices could extend from the panels and the panels could be directly plugged into one another, or if conduits were embedded into the modular housing components, then electrical wires could be run as easily and quickly as they are in conventional homes by licensed electricians. By setting up an exterior generator station, an entire complex of clipped together houses could be rapidly outfitted with electric heat, electric lights and cooking devices. Sewage treatment could also be molded into the panels, such as the electric incinerating toilets commonly used in Japan and on boats. The insulated panels could have R-values of up to 100 or more, making electric heat feasible. This would remove any temptation to heat with dangerous carbon monoxide gas-generating heating devices, such as kerosene lamps, fires, and the like.

In the event that a plastic modular housing panel is made in accordance with the present invention, it is also possible for windows and doors to be molded into the panels, as well as toilet incinerator outlet stacks and roofing components. In addition to large panels being made from the plastic, it would also be advantageous to provide various smaller components, similar to clipped together "logs" in order to allow for the greatest number of configurations for the modular house itself.

It would also be advantageous to provide methods, apparatuses and articles for a multitude of other applications, too numerous to mention here.

SUMMARY OF THE INVENTION

Therefore, in accordance with the above objects and advantages, the present invention discloses a new method for forming plastic into either a single skin configuration or a multiple skin configuration, usually two skins, which may also have contained therebetween either an expandable plastic material, reinforcements for strengthening the plastic article, other filler materials, or combinations thereof. In addition to the materials which can be incorporated into the middle layer between two skins, the present invention also discloses the use of many embedded articles to be placed between the two skins, whether they are completely embedded into the article, or whether portions of them are allowed to extend therethrough outside the molded article, i.e. for purposes such as mounting brackets, electrical wires, and the like.

Furthermore, the present invention lends itself to the manufacture of profile plastics, including hard and soft combinations such that a component can have a hard backing layer, with a foamed or expandable plastic front layer, such as would be useful for dashboards and automotive vehicle components. As inserts can be placed into or onto the mold due to its low temperature, even things such as ashtrays and carpet could be placed into the mold or could be placed onto the hot plastic after it has been molded onto, for example, the male or female mold. In this embodiment, the carpeting would be melded into the hot plastic, such that the carpet would never come off.

Multiple layers are also capable of being made through the methods in accordance with the present invention, including, but not limited to, in-mold paints. For instance, if the mold could be electrostatically charged, a powder coat paint could be first contacted with the heated mold, and then could cure at its proper temperature while the heated mold is accepting its contact with plastic particulates for producing a skin on top of the powder coated paint. Other multi-layer concepts are envisioned by the present inventors which may also include reinforcements or other materials to be sandwiched between multiple skins of plastic such as made by the multiple mold configuration.

For example, heated male and female complementary molds can each have a skin formed on their complementary face portions, followed by an expandable or foamable plastic being sprinkled onto either of the molds. In addition, a reinforcement, such as a metal wire mesh, may be shaped into the appropriate shape and inserted between the two skins. The two skins can then be spaced apart from one another such that the expandable foam will expand to the predetermined thickness, thereby embedding and surrounding the metal mesh which has been placed between the two skins. This configuration, i.e. the sandwich with the reinforcement therebetween, is capable of adding structural strength while maintaining a lightweight and inexpensive plastic configuration, which is much more light weight than steel.

Therefore, in accordance with the present invention, there are numerous important embodiments, including, but not limited to, an open mold made of aluminum or other suitable material which can be worked to impart a desired shape, heated and then contacted with plastic particulate to melt the plastic particulate onto the mold itself, thereby producing a plastic article. In another embodiment, male and female complementary molds made of similar materials can be heated on their face portions to a temperature above the melting point of a plastic particulate into which it comes in contact, and then the male and female articles can be held pressed or held together to form a double-skinned article.

In yet another embodiment, a double-skinned article can be manufactured using the male and female complementary molds from above, with the introduction of a plastic filler material onto one of the molds prior to holding the molds together, such that there is a "sandwich" which is formed from these plastic composites. In yet a further embodiment, the double-skinned embodiment further comprises an expandable plastic filler material which will give a double-skinned plastic article with an expanded plastic filler material therebetween. A predetermined thickness for the expandable plastic is created by holding the male and female molds at a predetermined distance apart. In yet another embodiment, reinforcements can be embedded into the plastic filler material or into the expandable plastic filler material such that when the expandable material is heated and expanded up around the reinforcement, the reinforcement is embedded into and surrounded by the expandable plastic filler material.

In yet still another embodiment of the present invention, mounting brackets, wiring harnesses, and/or other desired materials may be encapsulated within the plastic composite article itself or may be inserted into the mold prior to the two skin molds being placed in close proximity to one another, such that the plastic skin and the filler material can embed and encapsulate the mounting brackets, wiring harnesses or the like.

In addition, apparatuses for accomplishing these types of articles and processes are also disclosed, including a trunion design for moving and tipping the male and female mold sections to produce articles. Robots may be utilized to load reinforcements between the male and female molds prior to the filler material being melted or expanded. A vacuum apparatus for filling/emptying the plastic particulate into and around the mold is also disclosed incorporating a vacuum system and a blow bag for removing the excess plastic particulate once a desired skin thickness has been achieved. Further, plastic particulate from additional blower bags may be connected to the vacuum system in order to form layers of various other materials.

In yet one more embodiment of the present invention, there are disclosed various particular articles which are made by the process of the present invention, including, but not limited to, automotive components, industrial tabletops, airplane components, modular housing panels and components, material handling pallets, and many other applications which will be described hereinbelow or which will become obvious to one of ordinary skill in the art.

Therefore, in accordance with the present invention, there is disclosed new processes for forming plastic, apparatuses for carrying out those processes, and articles which are made therefrom. For understanding the present invention, we refer the reader to the following detailed description, taken in conjunction with the accompanying drawings and the accompanying text.

BRIEF DESCRIPTION OF THE DRAWINGS

FIG. 9 shows the trunion for rotating and tipping the excess material out of the mold container;

FIG. 10 shows the female mold for the pick-up truck bed box;

FIG. 11 shows the male mold for the pick-up truck bed box;

DETAILED DESCRIPTION OF THE DRAWINGS

Figure 1A:
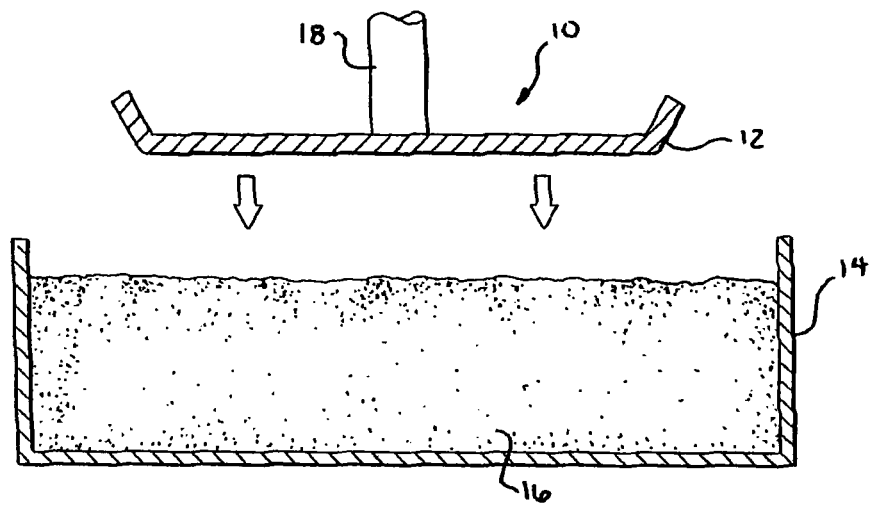
FIG. 1a is a side elevational view of the apparatus for utilizing an open mold in accordance with the present invention.

In accordance with the present invention, there are disclosed various processes for forming plastic, the apparatuses which are useful for performing those processes, and certain articles made therefrom. Needless to say, the scope of the invention will be determined by the claims and shall not be otherwise limited. As with all new materials and forming technologies, the number of applications and permutations of those applications are so numerous, they cannot all be mentioned here. However, in the spirit of providing the best mode and detailed description of many of the embodiments, the following description will be broken down into paragraphs, beginning with a generalized description of the technology, followed by specific applications and their descriptions.

I. General Description

In general, the present invention and process can be most basically described as the use of at least one single or a set of molds which is heated and contacted with at least a polyolefinic plastic particulate material. The polyolefin material may be in the form of powder, pellets, resin, shavings, or whatever. The contacting acts to melt the plastic particles into a formed article against the shape of the heated mold. The thickness of the article is determined by the length of time the heated mold comes into contact with the plastic. For example, a heated mold elevated to a temperature of from approximately 100° C. to 865° C. can be placed in contact with a powdered polyethylene material and will achieve a plastic skin thickness of approximately 1 mm for every minute that the mold is contacted with the plastic. For most of the applications described hereinbelow, it is most advantageous to have the plastic formed on the mold of a thickness from about 1 mm thick to about 10 mm thick, requiring a contact dwell time of between about 1 minute and 10 minutes. If other polyolefin materials are utilized, such as plastic pellets, which are much less expensive than ground plastic powder, the contact time must be adjusted accordingly. Specific times will be described hereinbelow with regards to specific applications and specific materials.

Although a single mold can produce a single piece of a plastic article merely by contacting the heated mold into a reservoir of plastic, it is further envisioned that a sandwich-type of composite material can be made by making both male and female mold portions, forming "skins" on each of the molds, and placing materials in between the two skins in a clamshell-type configuration with a filler or foaming plastic in between. Generally, the expandable foam is activated by the residual heat from the molds.

In the event that male and female mold skins are utilized, any type of reinforcing material or desired insert may be sandwiched between the two skins and may be fully surrounded by the filler or expandable foam plastic. For example, to add structural strength, it is envisioned that a whole host of reinforcements may be used. Especially strong is a metal mesh inserted between the two skins along with expandable plastic material which will attach the two skins to one another, while embedding the steel mesh there between. In yet another reinforcement embodiment, a sheet of Kevlar, a registered trademark of DuPont Corporation of Wilmington, Del., can be introduced between the skins and within the foamed plastic in order to provide a bulletproof door, for example, for airplane cockpit door applications. Small individual wire mesh cones may be utilized for superior strength. Furthermore, crumbed tire may be incorporated into the center of the male and female mold skins in order to make it nailable for modular housing applications. If it is desired that the plastic article needs to be cut to shape, then the insert/reinforcement material sandwiched between the male and female mold skins may be made of small particles such that the article can be machined or cut.

Any of the inserts or reinforcements may be pre-treated to aid in the adhesion between layers, or to help prevent the insert or reinforcement from cutting or shearing the foamed plastic that encases it, when under load. Such pre-treatments may include power-coating a wire mesh with a compatible epoxy resin; or applying a sulfonating technique to individual particulates, such as tire crumb or other recycled materials, to enhance their adhesion; or plating and/or depositing certain metallic or non-metallic coatings onto the insert/reinforcement to enhance adhesion; or even structural treatments such as sandblasting, surface grinding, tackifying with chemical treatments or the like; or the application of heat treatments such as annealing and/or quenching to change the surface properties; or the application of magnetic fields; or by forming an easy-to-adhere-to surface by forming or etching the insert/reinforcement to resemble reticulated foam by increasing the surface area.

Furthermore, it is envisioned by the present inventors that multiple layer structures can be formed by first making a male or female mold skin, followed by making a second male or female mold skin, and then a third complementary and mating male or female mold section can be formed. Each of these forms can be placed one on top of the other and heated with a filler material or foamable plastic in between, or with other materials which will melt and attach the skins altogether.

Because the present process is done at a relatively low temperature, i.e. slightly higher than that of the melting point of the plastic particulate being contacted with the heated mold, the mold itself will last a long time. In conventional injection molding, the plastic must be elevated in temperature to over 1,000° F., and commonly up to 1,500° F. in the worm screw before it is injected into the mold. With the combined effect of these high temperatures and high pressures used, the mold rapidly degrades. Also, the present invention is done in ambient pressure, rather than the many tons of pressure required by injection molding machines. Of special interest to all manufacturers, is the fact that the molds which can be used in the present invention may be made of pure aluminum or inexpensive and recyclable aluminum alloys such as kirksite which are cheap to make and easy to machine. Because of the low temperature and low pressure application, the molds do not degrade as they do in injection molding. For example, a mold used to make the entire truck bed box would cost more than a million dollars for a typical injection mold production mold, while the present invention mold can be made for less than one-tenth of that price. This factor alone will encourage new products because of the lower necessary up-front costs.

In that regard, the following description of the general article construction is disclosed, and will be followed by the various process embodiments for manufacturing articles in accordance with the present invention, and then by specific embodiments for various applications. Of course, the scope of the present invention is not to be limited to the specific applications promulgated herewith, but rather will be limited by the claims when they are filed.

II. General Article Construction

Figure 1B:
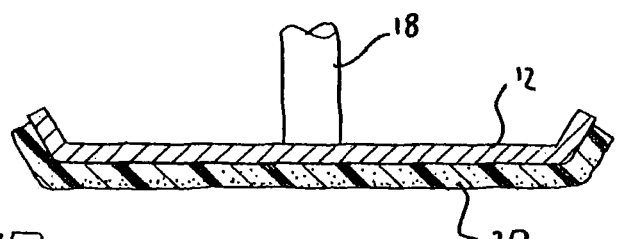
FIG. 1b is a side elevational view of the mold with a plastic skin adhered thereto.
Figure 1C:
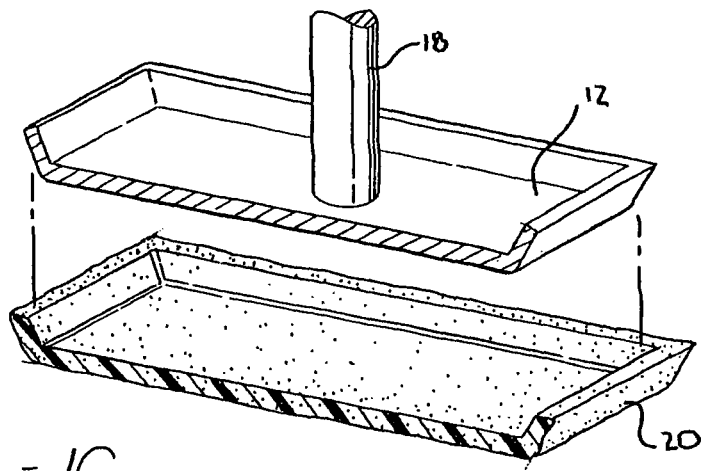
FIG. 1c is a perspective view of a plastic molded article of the present invention after it is removed from the mold.

With reference to FIGS. 1a-1c, there is shown an illustration of a very general article and the respective process for manufacturing articles in accordance with the present invention, generally denoted by the numeral 10. Mold 12 is shown as being formed to make a plate article with raised edges. Mold 12 is to be heated to an elevated temperature of greater than the melting point of the plastic particulates 16 held within container 14. As seen in FIG. 1b, an article 20 is formed once heated mold 12 has contacted plastic particulate 16 for a sufficiently long time to achieve the desired thickness of article. Thereafter, the heated mold can be purposely cooled, or allowed to cool, as illustrated in FIG. 1c and article 20 can be easily removed from mold 12. If heating and cooling lines are used in carrier 18 or in mold 12 itself, then cooling fluids could be run through the lines, which would automatically contract the mold as it got cooler, pulling mold 12 away from formed article 20, which would remain relatively hot when compared to a cooler mold.

Generally, the plastic particulate material may be powder, pellets, resin, or any other form of plastic, including sheets or blocks, and they may either be at room temperature, or at an elevated temperature, depending upon the application as will be seen further hereinbelow. Preferred plastics include HDPE, LDPE, polyethylene, polypropylene, polyurethane, or other widely used plastic resins. Environmentally friendly plastics, such as polylactic acid may also be utilized, or other plastics made from renewable sources including the plastic made by Cargill Dow from corn and its husks, or plastics made from the hemp plant. Mold 12 may be heated in a number of ways, including, but not limited to, heater lines in the mold itself for conducting hot water, oil or gas; a heat dissipative material attached to the mold itself or a backplate on the mold, such as mold carrier 18 of FIGS. 1a-1c; the mold might be heated in an oven to a predetermined temperature prior to contacting the plastic; the mold might be heated with heater torches or direct flame application; the mold might be heated with Infra-Red lamps or other light energy; the mold might be heated with microwave energy or other radio frequency energy; the mold might be heated with plasma heat generated by a plasma generator; the mold might be heated by thermoelectric devices in or on the mold itself; the mold might be heated uniformly over the surface to achieve a uniform coating of melted plastic or it might be selectively heated over portions of the surface so that multiple materials can be sequentially melted next to one another or spaced apart; the mold may be heated to a first temperature and contacted with a first material, and then may be heated or cooled to a second temperature to melt a second material; or the mold may be heated by any conventional means for heating a mold. Furthermore, combinations of these techniques may prove to be helpful, including heating the mold in an oven while also heating the mold with microwave or other radio frequency energy.

It is also envisioned that the plastic particulate material may be heated to a near melting point temperature before contacting it with a heated mold. The plastic particulate may be held in a container waiting to receive the mold, or it may find utility in a heated or unheated fluidized bed of the plastic particulate. Thus, submerging the heated mold into the fluidized bed would contact the heated mold with the fluidized particulates. The fluidized bed could be fluidized with gases other than air such as nitrogen, helium, sulfur-containing gases, etc., in order to impart a surface effect once the plastic melts and sticks to the heated mold. If a different gas was utilized, any number of surface effects could be experienced, which might help with adhesion of later layers, or could help with "sealing" the plastic once it was formed into an appropriate shape. Possible gas applications would include the use of a sulfur-containing gas to effect a sulfonation of the plastic in order to prevent chemical migration through the plastic, the use of an inert gas such as argon or neon to cause a peening, annealing or quenching effect of the plastic without effecting any surface chemistry reactions at such elevated temperatures; a nitrogen-containing gas to prevent oxidation of the surface; a fluoride or other halogen-containing gas to effect electrical conductivity changes on the surface of the resultant article; hydrogen or helium gas may be used to encourage thermal transfers through the plastic if the article is a relatively thick or bulky piece; or various acidic or basic gas compositions to impart a particular predetermined pH on the surface of the article.

Moreover, it is also envisioned that an initial layer of viscous plastic may be imparted on the bare surface of the heated mold 12 by contacting with a finely ground powdered plastic first to form a first "sticky" surface prior to contacting with heavier plastic particulates in order to provide an adhesion layer for subsequent contact with other, possibly less expensive plastics. This viscous layer may be accomplished by contacting the mold with a finely powdered plastic first, or by using heated plastic particulates, or heated and finely ground plastic material combined. In addition, a different type of plastic may first be used, one which exhibits greater flow and adhesion with the mold material, followed by the bulk plastic material.

For certain applications, it may be advantageous for the adhesion of a first plastic, one that is relatively expensive, to be followed up with at least one more layer of inexpensive plastic. This way, an article can have the desired strength from a bulk or recycled plastic, while the skin can be made of an expensive material with decorative features or colors. Color can be blended right into the underlying materials so that any scratches or minor surface blemishes will be indistinguishable from the surface, alleviating the necessity for repairs. The inner layer(s) of material may also be selected to impart strength, heat insulation, fire retardation, energy dispersion qualities such as impact or bullet resistance, or filling with various materials to achieve certain other qualities, such as the inclusion of crumbed tire to give a spongy center, or one that can be easily cut, scored or nailed. Insulation materials may be included for modular housing panels.

Figure 2A:
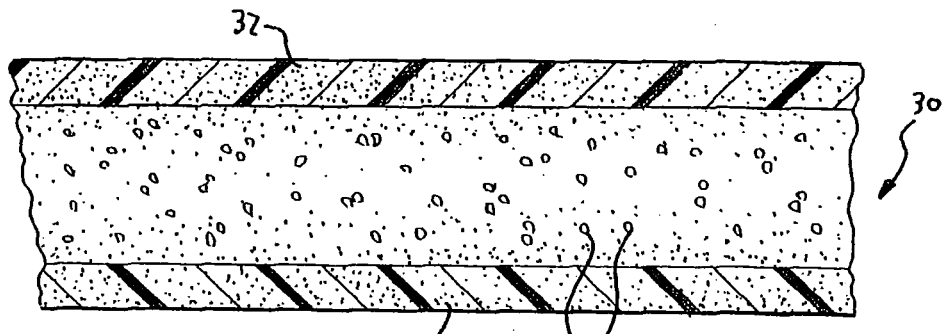
FIG. 2a is a side elevational view of a cutaway portion of a double skinned article made in accordance with one of the embodiments of the present invention having an expanded foam in the center of the article.
Figure 2B:
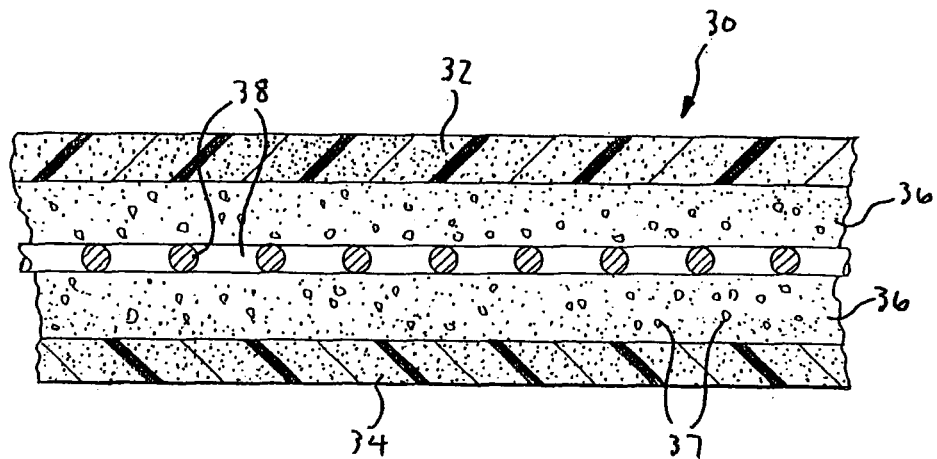
FIG. 2b is a side elevational view of a cutaway portion of a double skinned article with an expanded foam center and a wire mesh reinforcement embedded and surrounded therein.

Looking next to FIG. 2a, there is shown a multilayer structure made in accordance with a preferred embodiment of the present invention which is generally denoted by the numeral 30. First and second plastic skins 32 and 34, respectively, are individually formed on separate heated complementary male and female molds, and then a foamable or expandable plastic 36 may be placed between the two skins and heated to expand and adhere to the two plastic skins, forming a lightweight, but very strong, article suitable for many applications. Air pockets 37 are formed as a consequence of the expansion of expandable plastic 36, available from numerous plastic resin suppliers. An especially desirable expandable plastic is available from Equistar Corporation of Cincinnati, Ohio. As will be discussed below, any number of porous sheets, wire meshes, or other inserts and/or reinforcements can be loaded onto the first male skin mold prior to the placement of the foamable or expandable plastic and prior to the second female skin mold being put into place over the first skin mold. Generally, it is most advantageous for the expandable or foamable plastic to be activated by the heat which is imparted by the two heated male and female molds as they are held together in a spaced apart relation with the foamable plastic and/or any desired reinforcements in between. Once the expandable plastic is expanded due to the heat imparted from the first and second molds, any insert or reinforcement which was placed between the molds is encapsulated and sandwiched into the article 30 structure. Looking now to FIG. 2b, there is shown again a multi-layer structure generally denoted by numeral 30 having a reinforcing wire mesh 38 shown embedded and encapsulated within expanded plastic 36, and between first and second plastic skins 32 and 34.

Numerous other inserts and/or reinforcements may be encapsulated between the top and bottom skins, including, but not limited to, wire meshes for strength, metal bars and mounting pieces which are to extend outwardly from the skin to facilitate mounting to other fixtures, Kevlar material may be sandwiched to render the piece bulletproof, such as for airplane cockpit doors, or fire retardant materials may be used as sheets to prevent burn-through. Other material properties can be exhibited by inclusion into the plastic skins of magnetic materials, ceramic powders or whiskers for heat and flame resistance, chemically resistant materials, thermoelectric materials, colored pigments, tough plastics for impact resistance and energy dispersion, anti-microbial chemicals on the surface, enzymes for different purposes, among others.

Virtually anything can be encapsulated in the expandable plastic, and it will be kept encapsulated until a total rupture of the multilayer structure occurs. The only restriction is that the insert or reinforcement will experience an elevated temperature due to the heated molds which can melt or deform certain types of material. The inserts can be entirely encapsulated, or only partially encapsulated such that portions of the insert can extend outwardly from the plastic article. This will enable the plastic article to have mounting bars encapsulated by the plastic, with mounting bar portions extending outside the article to be mounted on, for example, a metal truck chassis frame by bolting or otherwise fastening the mounting bars to the chassis. Furthermore, the insert may be a heat resistant or insulative piece which can contact a metal frame, without dissipating the heat to the plastic article, and alleviating a fear of melting.

Figure 3A:
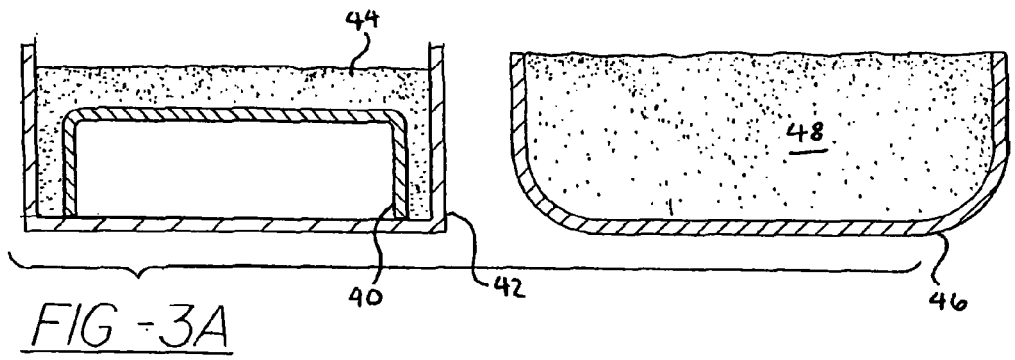
FIG. 3a illustrates both a male and female mold in contact with plastic particulate.
Figure 3B:
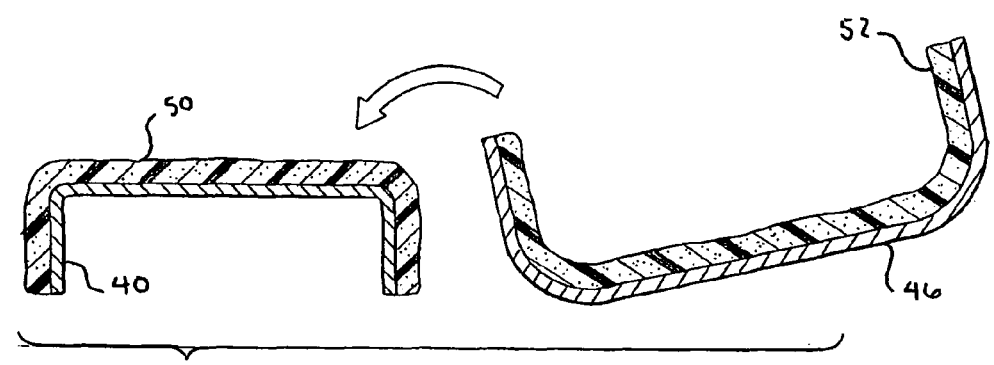
FIG. 3b illustrates side views of the male and female molds with plastic skins thereon.
Figure 3C:
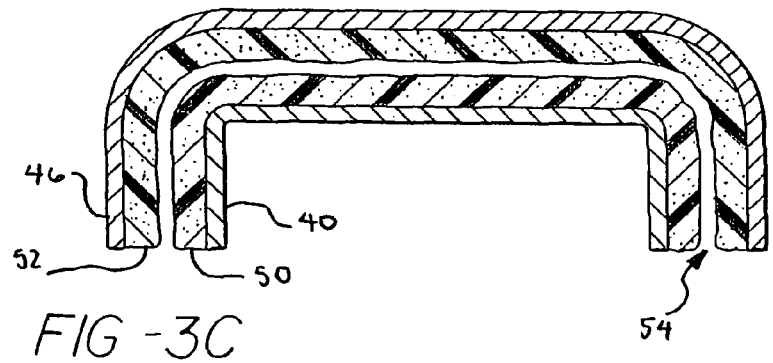
FIG. 3c shows the skinned male and female molds in complementary positions.

As seen in FIGS. 3a-3c, there is shown a method of making a double skinned article, such as a pick-up truck bed box or housing module. Heated male mold 40 is placed into a box 42 containing plastic powder or pellets 44 or the plastic particulates may be blown into the box after the mold is in the box. A skin 50 forms on top of the mold, as shown in FIG. 3b. The female mold 46 is shown filled with plastic particulate matter 48, and a second skin 52 is formed on the inside of female mold 46. Thereafter, the excess plastic particulates are removed by dumping or vacuuming, an expandable foam is distributed between the molds, and the male mold is placed within the female mold, or vise versa, and held at a predetermined distance apart so that the expandable plastic 54 can be expanded between the two molds with their respective skins. The expandable plastic can "foam up" until it fills the cavity created by the two mold pieces. If the molds are secured to one another while leaving a one inch (1") space between them, a one inch expansion will occur. If, on the other hand, the mold pieces are maintained six inches (6") apart, then the expansion layer will be six inches thick. As described above, any desired inserts and/or reinforcements may be placed between the two molds, along with the expandable plastic, before they are placed together and the heat from the molds heat up the expandable foamable plastic to make it expand. Once the expandable plastic sets, it will encapsulate the insert/reinforcement within the skins and will secure the insert/reinforcement from any side-to-side motion, especially if the insert/reinforcement has any surface contour or porosity so that the expandable plastic will surround the insert and hold it in place. The inventors have found that gravity alone is a sufficient force to hold the two molds together, held apart by spacers, and the residual heat from the mold is sufficient to kick off the expandable foam plastic such that it will expand.

In the event of using this technology for a pick-up truck bed box, it is envisioned that the wiring harness can be embedded into the truck bed box itself, with the electrical connectors extending outwardly from the box, ready to be plugged into the electrical connections coming out of the back of the truck. The wiring components can be laid onto the male mold before the female mold is laid over top of it, and before the expandable plastic is subjected to heat, causing it to expand and encapsulate the wiring components right into the truck bed box itself, while allowing the connectors to hang loose, ready to be assembled into the truck. In the alternative, a conduit could be embedded into the plastic truck box to allow for wiring to be fed therethrough. The outer skins of the truck bed box can be molded to perfection with color so that painting of the truck bed box is unnecessary. Other applications for the present technology will be discussed below, and the appropriate configuration and insert/reinforcement for each application will be discussed.

The inventors also envision that the mold itself can be made of an electrically conductive material. This electrically conductive mold can be charged to attract fine plastic particles, melt them on the surface, and form a thin-skinned part to be removed after cooling. This is also suitable for use with electrostatic powder coat paints. For example, a mold can be electrically charged and sprayed with a releasable powder coat paint resin first, then heated and cured while using the curing heat to heat the mold and then contacting with plastic particulates which will adhere to the paint, to a desired thickness. Upon cooling, the newly formed article will "pop" out of the mold with a freshly cured paint job thereon.

Figure 4:
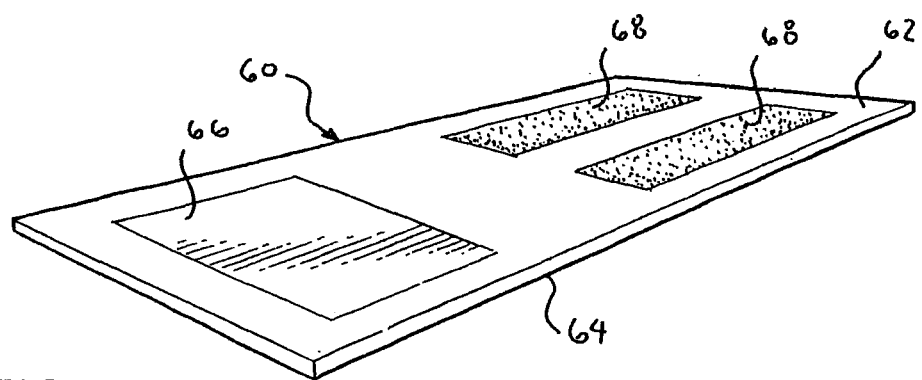
FIG. 4 is a perspective view of a flat panel made with various materials over various portions of the article.

It is also envisioned by the present inventors that varying materials can be used across the surface of a formed article, as shown in FIG. 4, with the article being generally denoted by the numeral 60, with top and bottom skins 62 and 64 respectively, and having various materials 66 and 68, respectively. This is accomplished by heating various portions of the mold and contacting with different materials. Preferably, heater lines can be incorporated into the mold in separate sections. For instance, the mold could first be heated in the regions of area 68, and then contacted with a first material. Then, the mold would be cooled in those areas, such that it would not melt plastic, although the remainder of the mold, the top skin 62 could be heated so that a second material would be melted against its surface. Likewise with the material region 66 as shown in FIG. 4., which could remain cool during the first two procedures, but would be heated by itself later on and then contacted with a third material. Other means are envisioned for only heating certain portions of the mold, while controlling which portions will have different plastics adhered to those various portions. In addition, once the multi-material layer has been formed, the double skin, or sandwich concept described hereinabove, may come into play in order to form a foamed or reinforced article from a multiple material skin.

Therefore, the various material configurations, layers and inserts/reinforcements envisioned, among others, are described. There are many more configurations which will become apparent as we discuss some of the most pertinent applications hereinbelow.

III. Various Process Embodiments

Now that we have discussed the actual structure of a portion of an article made in accordance with the present invention, we will turn to the various methods of contacting the powder to the mold, so that the mold can melt the plastic and form it to its ultimate shape.

Figure 5:
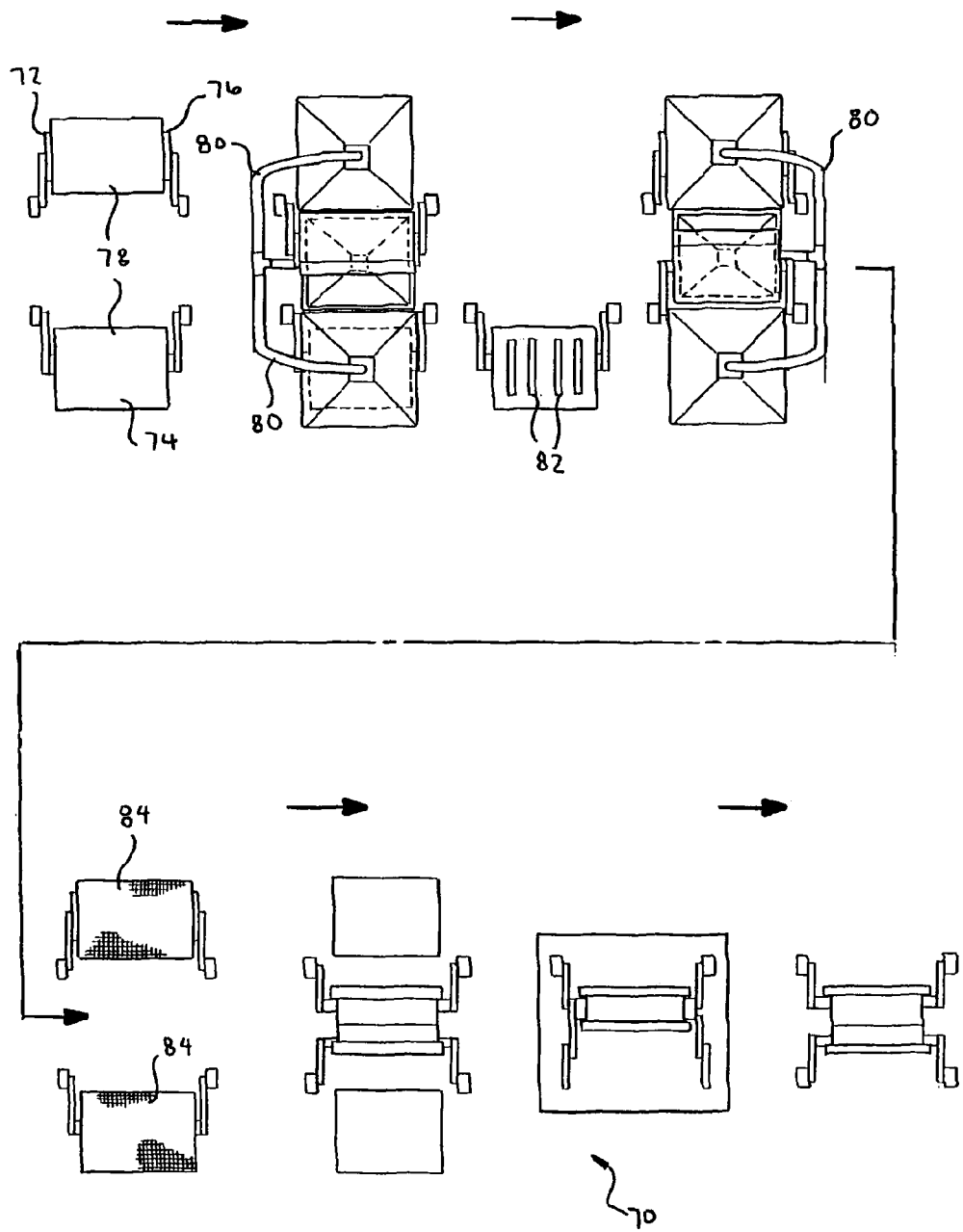
FIG. 5 is a schematic of the basic process steps used in one of the embodiments of the present invention for making a pick up truck bed box.

Because one of the most pressing applications is for automotive vehicle components, the basic tip molding process embodiment of the present invention will be discussed now with respect to a polyethylene pick-up truck bed box. As shown in FIG. 5, there is a production method for manufacturing the truck box in accordance with the present invention by using an upper and lower line generally denoted by the numeral 70. There are two molds shown, top and bottom 72 and 74, which represent the male and female molds being covered with melted plastic. The mold is heated by any of the acceptable methods described above, which may include placing in an oven, heating with torches, or by utilizing lines within the mold to contain hot water, oil or gas. In the case of the male mold, the heated mold is placed within a box 76 capable of holding the mold and containing enough plastic particulate to cover the male mold. In the preferred embodiment, while this is going on, the female mold 74 is heated and then filled with the desired plastic particulate 78, and both are allowed to remain in contact with the heated molds for approximately six to eight minutes to achieve a polyethylene truck bed box skin of about three millimeters (3 mm) thick. Then, the molds are either tipped upside down to dust off the excess plastic particulate or the excess is vacuumed out of the box by vacuum hoses 80.

Figure 6:
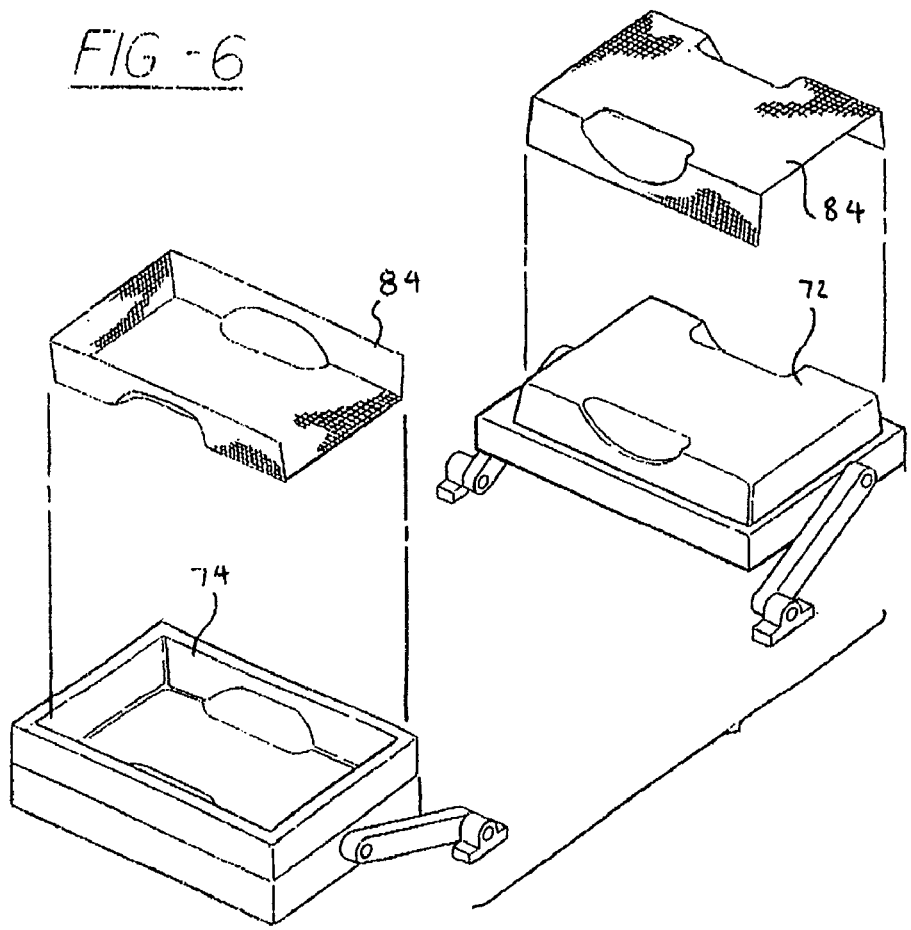
FIG. 6 is an illustration of the pre-formed male and female steel wire mesh reinforcements to be embedded into the pick up truck bed box.
Figure 8:
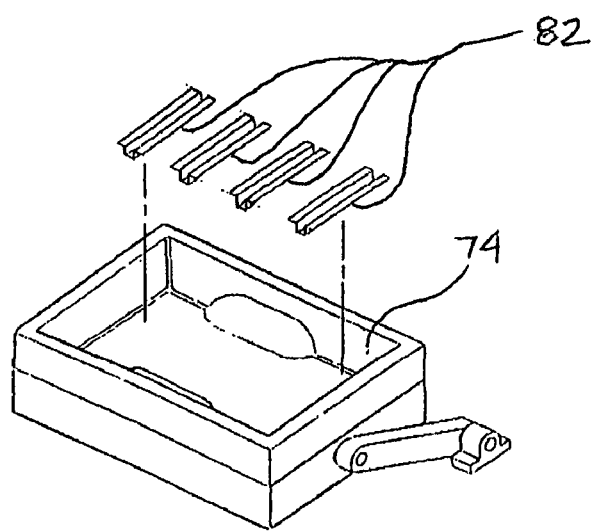
FIG. 8 shows the load rails being inserted into the mold.
Figure 7:
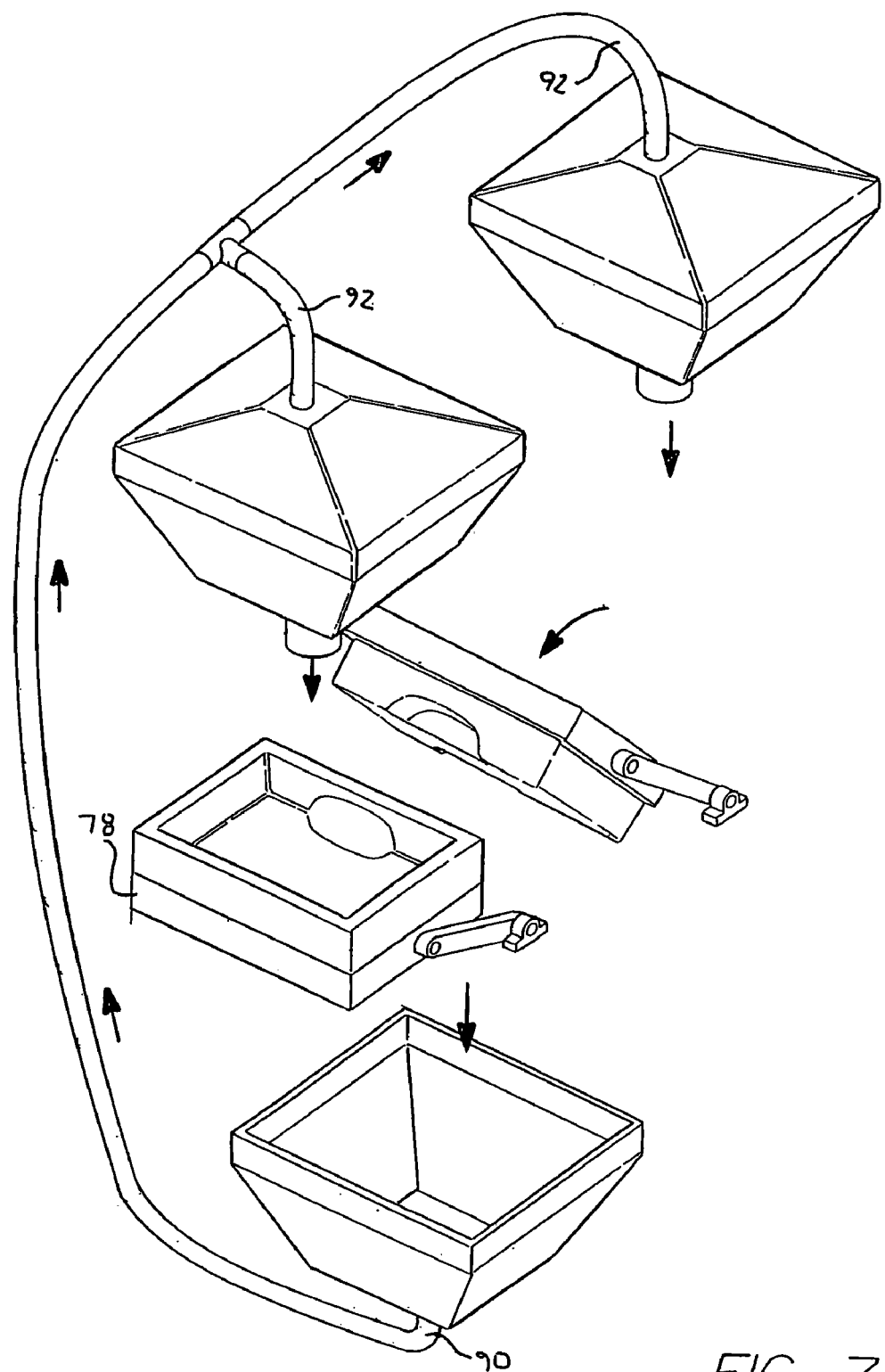
FIG. 7 shows the vacuum and blower lines used to fill and remove the plastic particulate material.

Load rails 82 and a steel wire mesh reinforcement screen 84 is laid onto the top of the male mold as seen in FIG. 6. This wire mesh 84 adds strength and impact resistance to the truck bed box once manufactured. A second wire mesh 84 may be especially useful, and would be placed in the female mold after the excess plastic has been removed. Thus, a set of complementary wire mesh reinforcements 84 can be encapsulated between the double skins. After expandable plastic has been placed on the male mold, the two pieces are then slid into and over one another and the expandable plastic is heated by the residual heat in the hot molds and the expandable plastic "blows" and expands to fill the cavity which has been pre-set by the distance that the male and female molds have been held apart. Then, the mold is cooled, and the part is popped out. In this embodiment, and as shown in FIG. 7, it is envisioned that having a vacuum portal 90 attached to the bottom of the mold will aid in the removal of any loose plastic particulate after the desired thickness has been achieved. As shown in FIG. 8, load rails 82, or any other desirable mounting means, may be lowered into the bottom of the female mold 74. That way there will be steel mounting rails 82 extending from the bottom of the truck bed box, so that mounting will be easily achieved on the truck chassis.

It is also envisioned that there could be vacuum lines 92 and hoses attached to the top and bottom of the mold-containing box or into a cap to be placed over the female mold, and those vacuum lines 92 could also be a means for delivering the plastic particulate 78 onto the top of the mold. Whether male or female, the plastic particulate is allowed to sit for an appropriate resident time, and then vacuumed out from vacuum portals 90 located in the bottom. The plastic particulate materials could be cycled in and out of the molds. For example, vacuum line 92 could be used to blow in the plastic, and then vacuum portal 90 could be used to vacuum out the particulate after it has contacted the heated mold for a sufficient length of time. Or, the same lines could be used to blow in and vacuum the plastic. Further, the vacuum lines could be valved to different bags filled with different materials to achieve a multi-layer article. The particulate would then be the moving part, not the mold. This would allow the heated molds to remain stationary, thereby alleviating the need for tipping over the mold, and would require the same amount of time for filling and emptying the molds. Furthermore, multiple plastic sources would be much simpler due to the ability of picking up any plastic particulates, including different materials for multiple layers, or different regions with varying materials.

Looking now to FIG. 9, there is shown another embodiment of a trunion 100 used by the present invention for "tipping" the loaded mold(s) in order to empty out the excess plastic particulate after the appropriate time for melting has taken place. A cradle 102 is incorporated into the apparatus and is shown for tipping the mold 104 about a pivot 106, effecting the tip molding method of FIG. 5.

Figure 12:
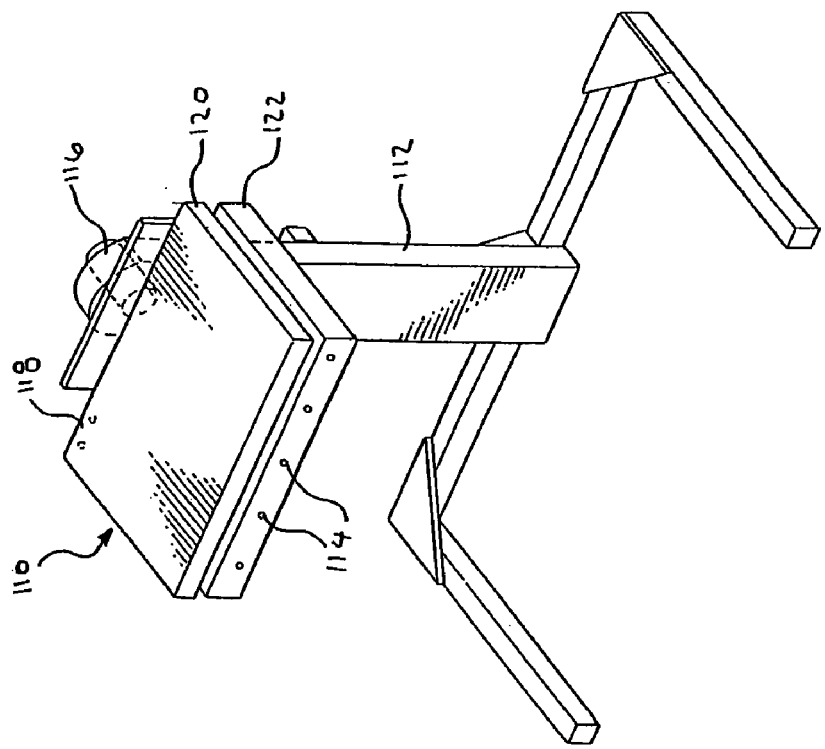
FIG. 12 shows a test tool design with a male and female cavity and core molds.

FIG. 10 illustrates the preferred embodiment for the lower side of the truck bed mold 74, while FIG. 11 shows the upperside of the truck bed mold 72. FIG. 12 shows a truck bed test tool design 110 for making test "plaques" on a rotating stand 112. The molds are made with a cavity and a core design. The mold is heated with electrical cartridges 118 by controllers (not shown) and the test plaque is cooled for release by mold waterlines 114. The mold is attached to a rotating stand 112 so that the excess plastic particulate can be "tipped" out. Rotation about a pivot 116 is utilized to "tip" out the excess. Cavity 120 is shown above the core 122.

Figure 13:
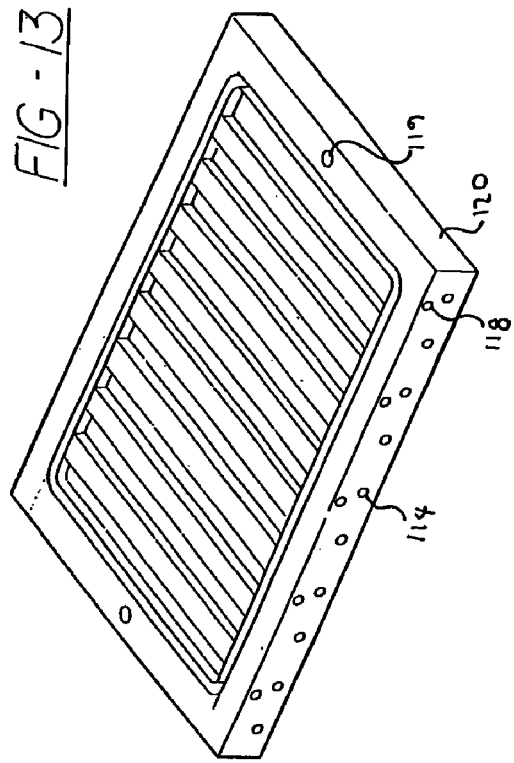
FIG. 13 shows a cavity mold for the test tool.

FIG. 13 shows the test device of FIG. 12 with the cavity and the waterlines 114 in conjunction with the waterlines and the heaters 118, in more detail. Thermocouples 119 are shown. This mold configuration may generally be applied to other relatively flat double-skinned items, such as the modular housing units.

Figure 14:
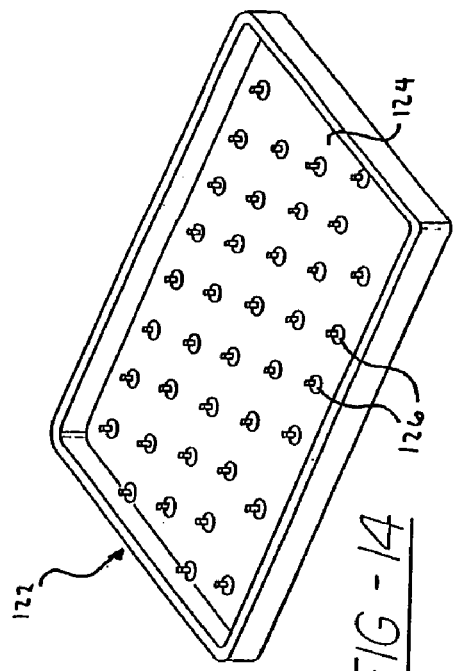
FIG. 14 shows a core mold for the test tool.
Figure 15:
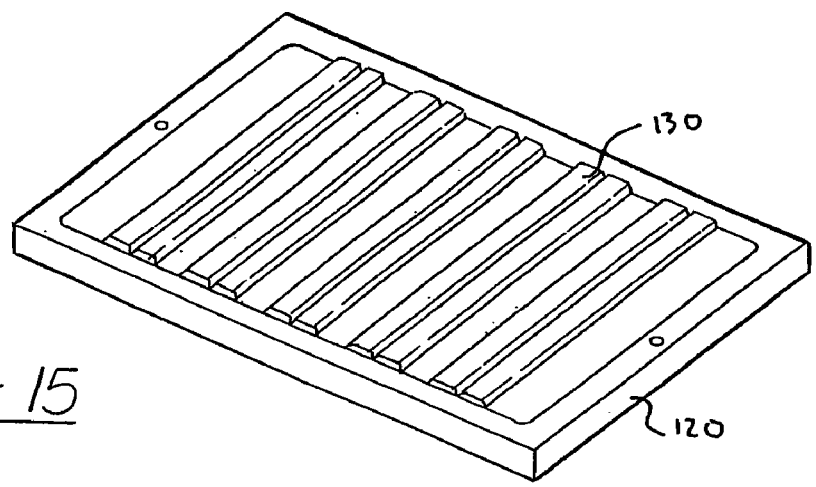
FIG. 15 shows the cavity side with a screen.
Figure 16:
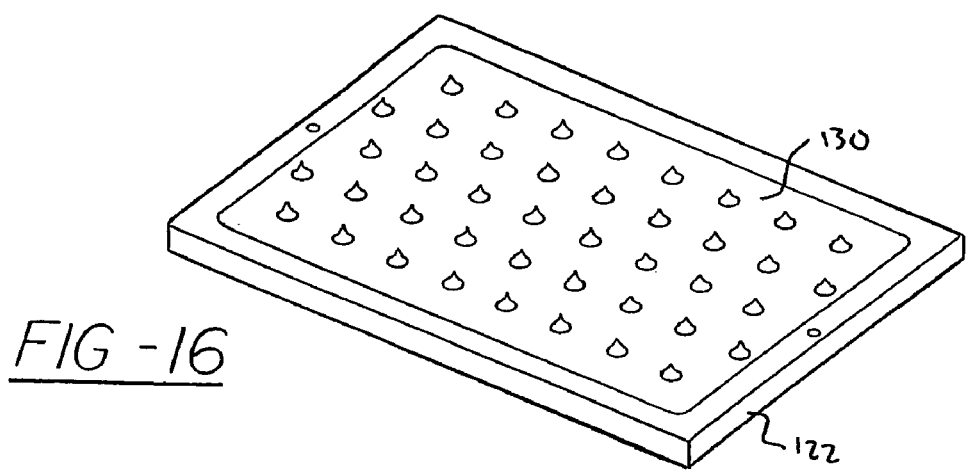
FIG. 16 shows the core side with a screen.
Figure 17:
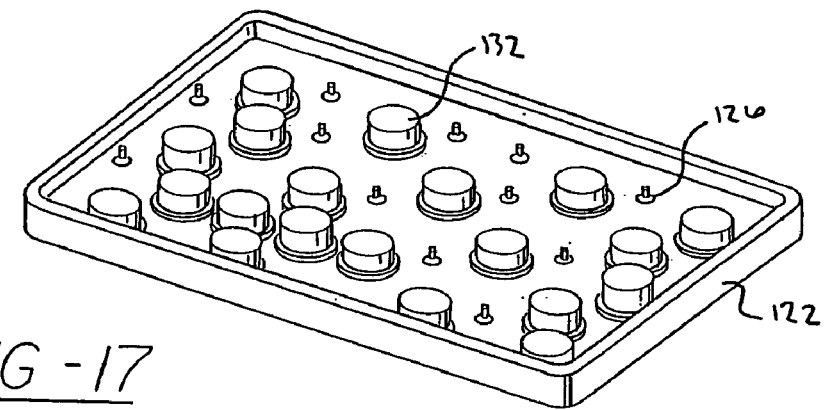
FIG. 17 shows a core with the broad cone reinforcements.
Figure 18A:
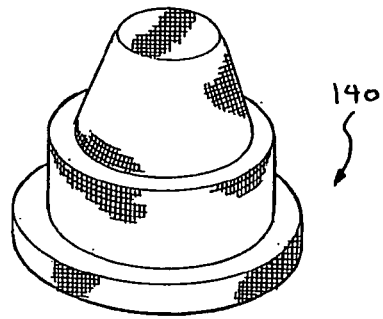
FIG. 18 shows plugs to mount into the core to receive cone reinforcements.
Figure 18B:
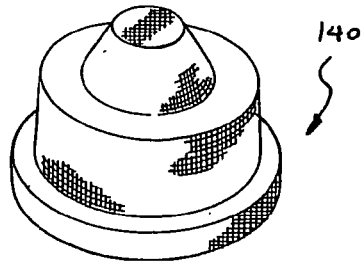

Looking next to FIG. 14, a core 122 is shown with an insert block 124 and reinforcing cones 126 where they are located. The "cones" 126 are located at the places where the load might be the greatest in the resulting article, thereby requiring the most reinforcement. FIG. 15 shows a screen die 130, within the cavity 120, while FIG. 16 shows the same screen die 130, but from the core 122 side. FIG. 17 shows yet another embodiment with a redesigned core insert to incorporate a larger cone design 132 for additional strength. FIG. 18 shows mold plugs 140 which will be mounted to create the indentations for receiving a cone reinforcement once the male and the female molds are together with the reinforcements being held therebetween.

Although the plastic particulate may be powder, pellets, resin, sheets, blocks, or any other commercially available form of plastic, it may be any suitable polyolefinic chemical composition, so long as it melts at a reasonable temperature. The plastic may contact the heated mold by any number of methods, including, but not limited to, spraying, either manually, robotically or through spray bars; dumping plastic over the mold and containing the over-dumped amount in a container with the heated mold inside (in the case of a male mold), or it may be dumped or sprayed directly into a female mold. The plastic can be distributed with a shaker arm or may be done manually. Or, the blown in/vacuumed out method as described earlier may be most advantageous in which the plastic may also be blown into a container with the heated male mold inside, or may be blown into the cavity directly, as created by a female mold. In either event, the excess plastic may be vacuumed out of the box or the mold, or the excess may be "tipped" out by rotating the mold to drop the excess plastic from the heated mold.

Yet another embodiment for the process may use a fluidized bed to contact a heated mold with plastic particulate. Although most easily accomplished if the plastic is in the form of powder, the present inventors also envision that the fluidized bed could use pellets after a first layer of powder is melted onto the mold. A fluidized bed configuration may also use the vacuum concept discussed above for introducing the plastic, as well as for flowing and removing the plastic.

Still yet another embodiment for contacting the plastic to the heated mold may include the use of a heated, electrically charged mold coming into contact with an electrically charged plastic which is sprayed toward or onto the surface, and held on the surface of the mold. This electrostatic method may require further layering to achieve a perfectly painted surface once the article is removed from the mold. Since the mold pieces can be "clam-shelled" together after the skin has been formed, this electrostatic method may be able to make very thin skins for the production of thinner, more delicate, articles. For adhesion, the electrostatic method may require the use of an epoxy resin, as is usually used with powder coat paints, known well in the art. However, it is believed that combining the traditional epoxy spraying with heating the electrically charged mold and contacting it with electrically charged plastic particulate is a novel method. Then, when the part is released from the mold, either the heat from the mold will cure the resin paint, or it can be heated even further to impart a beautifully cured painted surface, just like powder coated paint. Or, the plastic particulate could be in the form of a powder that is somewhat electrically charged, and it could be attracted to the heated mold by the electrically charged heated mold. A fine powder would be able to be sprayed on, or used in a fluidized bed, as described above. A heavier, coarser plastic particulate may be utilized in order to save money on the powder. In this instance, it may be advantageous to incorporate a thin layer of finely ground powder material prior to contacting with the coarser material, in order to encourage a thin, tacky layer of plastic to build up first on the mold, making it easier for the coarse material to heat and "stick" to the mold. True to electrostatic coating, a finer plastic powder which is electrically charged could be attracted to the mold, and then heated while the powder is being held in place by electricity, in order to melt the plastic and form a thin-skinned article. Once the skins have been formed by the electrostatic method, the male and female portions can be "clam-shelled" together and any other inserts and/or reinforcements may be utilized in conjunction with expandable plastic therebetween, similar to the description above.

Now we turn our attention to additional materials, inserts and/or other reinforcements which may be useful in strengthening the plastic forms. Additional materials may render them fire resistant, or as thick or thin as needed. Although this is not an all inclusive list, the following additions are specifically envisioned for various applications: metal screens, grids and meshes, either bare or coated, such as with powder coating, as well as screens, grids and meshes that may be welded or secured with adhesives to prevent lateral shearing motion; thermoelectric devices for heating and/or cooling; slag, lava, and other construction materials to act as heat resistant fillers, fiberglass whether in the form of mesh, woven or non-woven for strength; whisker-filled particulates; conduits or pipelines used for cooling the center of the mold, i.e. pins placed in the mold; electrical wires or conduits placed in the center to house electrical wires; foamed or solid ceramics for adding tensile strength without weight; a pre-formed foam core with a higher melting temperature; metallic structures, such as metal mesh reinforcing cones or other high-rising embeddable structures to add strength; low density stones or other naturally occurring low density materials; wood in any shape to be used for reinforcements or to add strength without adding much weight; metal mounting or securing reinforcements, including metal bars and mounting plates for mounting purposes; whiskers of various glasses such as fiberglass; Kevlar to impart impact and energy dispersion; fire retardant materials; anti-microbial agents to be placed near the surface for alleviating germ transfer; chemical treatments at the surface to reduce chemical interactions with materials being contained within the articles; and any other desirable insert.

Figure 19:
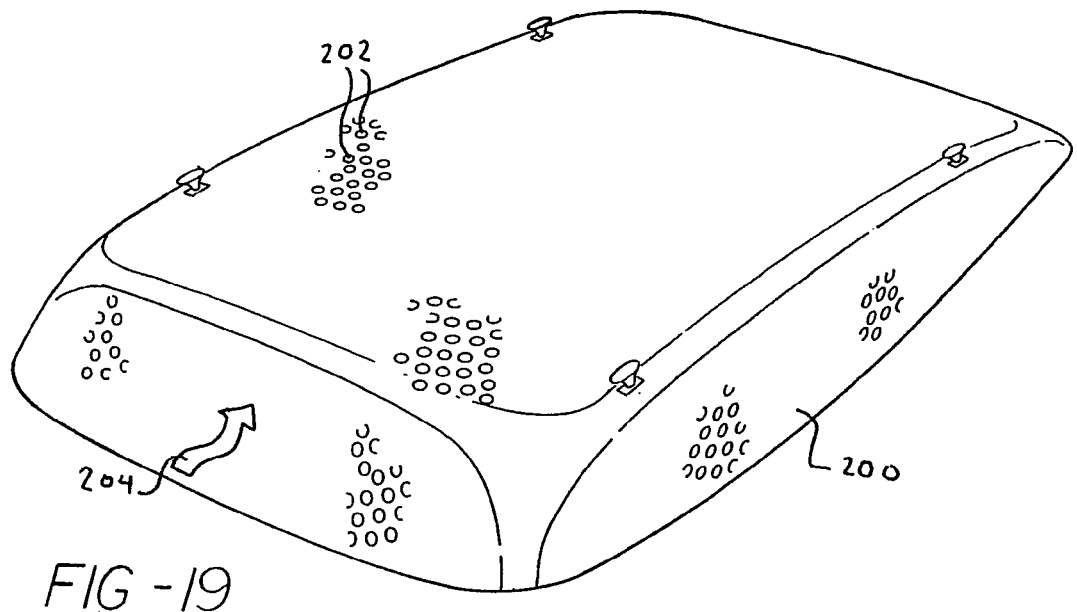
FIG. 19 is a perspective view of a van roof with the dimpled surface effect.

In addition to the above described inner workings of articles made in accordance with the present invention, certain surface effects can be molded directly into the article itself. One embodiment of the present invention which deals with surface effects only is illustrated in FIG. 19, showing a raised vehicle roof generally denoted by the numeral 200 having dimples 202 to allow air flow 204 to glide thereover. The dimples 202 are similar to the dimples on a golf ball which improve the aerodynamics of a large vehicle roof. In the instance of a large van or mini-van, the effect could be significant. The dimples 202 could occur over the entire surface, or may be located in the front only. In addition, it is envisioned that the dimples may be of the same or of varying sizes across the surface. Because the popularity of raised roof vans is gaining, as they improve headroom in vans, the added height of the raised roof vans increases the frontal area, thereby increasing overall drag for the vehicle. This has a negative effect on the vehicle fuel economy. The proposed dimpling positively effects the fuel economy of such vehicles by interrupting the attached flow of air, while the laminar flow of air becomes turbulent flow. It is known that turbulent air flow on the back side or downward side of center of the vehicle will reduce the vehicle aerodynamic drag. This embodiment may also be used on side panels, or any other surface which needs to have its drag reduced.

Figure 20:
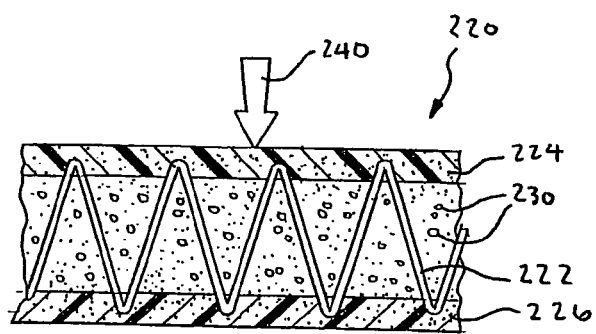
FIG. 20 is a side cutaway view of the energy absorbing embodiment of the present invention.
Figure 21:
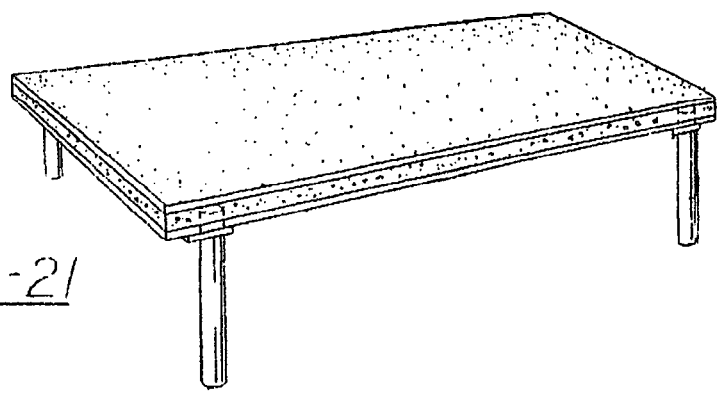
FIG. 21 is a side perspective view of an industrial tabletop made with the present invention.
Figure 22:
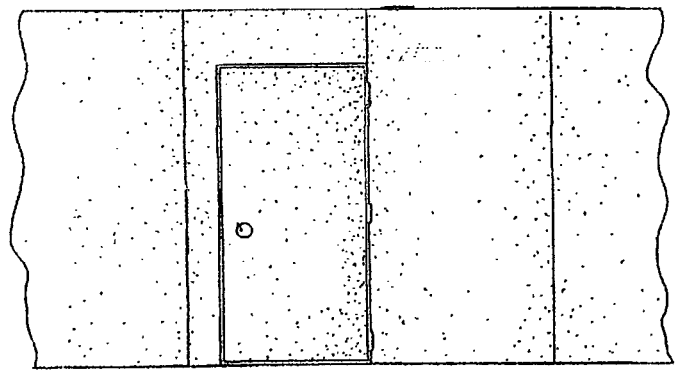
FIG. 22 is a front elevational view of an airplane cockpit door made with the present invention.
Figure 23:
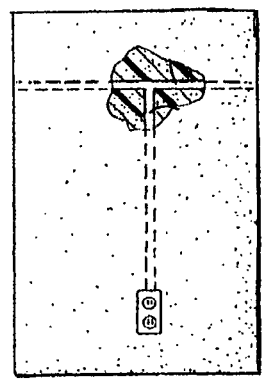
FIG. 23 is a front elevational view of a modular housing panel with electrical conduits running horizontally and vertically.

In addition to the other disclosed insert or reinforcement materials, a zigzagged metal wire reinforcement may be embedded into the skins of polyolefin material for energy absorbing applications such as knee restraints, dashboards and the like. FIG. 20 illustrates how the wire is anchored in place within the polyolefin skin. Especially useful will be a hard side to support the load while the other side may be soft to permit controlled distortion on impact. It is especially useful if low density plastic foam is used between the two skins. FIG. 20 generally denotes the energy absorbing article as 220, and includes a zigzagged wire reinforcement 222 embedded between inner and outer skins 224 and 226 respectively. Low density foamed plastic 230 is shown in the center, surrounding the wire reinforcement 222. As can be seen from the drawing, an impacting force 240 would have its energy absorbed by crushing the wire reinforcement 222, which will collapse upon impact, and smashing the low density foam. In addition, certain energy dispersive materials such as Kevlar or certain energy dispersive foam pre-forms may be embedded into the plastic article to absorb and/or disperse energy. Such an energy absorbing combination would allow lighter-weight components to be used in vehicles, while maintaining the structural strength needed for safety. This material composite can be used for high impact resistance bumpers or front end modules, in addition to interior components.

In this invention, the most preferred embodiment of the pick-up truck box includes a high density polyethylene truck box having an embedded welded steel wire grid. Having been powder coated, and thereafter formed into a pre-formed piece that can be dropped into the mold after the two skins are formed, the wire grid is inserted before the skins are "clam shelled" together. It has been discovered that by encapsulating the wire mesh pre-form between the plastic skins, the coefficient of linear thermal expansion of the combined materials becomes that of the mold material. Complementary male and female wire grids may include raised, cone-shaped portions for additional reinforcement and strength. This type of configuration also finds special utility with regards to vehicle roof components, pillar sections, underbody components, wheel well covers, large battery trays and floor sections.

The long glass fibers used in prior art manufacturing techniques generally exhibit a strength of about $3\times10^6$ PSI modulus, while the composite with metal reinforcement of the present invention exhibits the modulus of the metal itself, generally on the order of $30\times10^6$ PSI modulus, or about ten (10) times stronger. Each of the reinforcements listed above provide additional modulus strength to the plastic composite article. In that regard, if the modulus strength of metal is necessary, then it is useful to utilize a metal reinforcement. On the other hand, if an impact resistant part is required, then the reinforcement could be a memory plastic foam that will "bounce back" after the impact. If the desired article needs to bend around a corner, then the skin material and the reinforcement would be selected accordingly.

When making a multi-layer article in accordance with the present invention, the male and female skinned molds or "clamshells" may be allowed to lay on top of one another, or the two "clamshells" may be clamped together if gravity alone is insufficient to handle the job. In that case, the clamping may be accomplished via hydraulics, pneumatics, hydropneumatics, or electrically. If an expandable foam center is to be used, the molds may be clamped together while being held apart at a pre-determined distance in order to determine the thickness of the part. However, in general, the weight of the top mold will hold it down onto the bottom.

Cooling of the heated mold may be accomplished by various means, including, but not limited to utilizing heating/cooling lines within the mold itself; moving the entire plastic/mold assembly into a freezer or refrigerator or some other climate controlled room. Thermoelectric devices may be used in the mold to cool. Once cooled, the plastic article generally pops off the heated mold and does so easily. The cooling configuration could also be in the form of pins that can be inserted within the mold after the heating takes place, and the pins could be refrigerated themselves, or could contain lines that will cool the mold. These pins could be easily removed from the mold so that the next cycle of the mold could be a heated cycle (with heater lines already in the mold-just turned off during the cooling phase).

Therefore, the process and articles made in accordance with the present invention have been described. Now we turn to specific applications, and the configuration of some of the individual manufactured articles.

IV. Specific Applications

Specific applications for the above invention may include, but are certainly not limited to: automotive and industrial vehicle components such as pick-up truck bed boxes, SUV roofs, underbody constructions, and wheel wells; modular housing panels; airplane components; consumer and industrial furniture; doors; windows, material handling pallets and other articles; consumer goods; industrial articles; marine applications and boat hulls; molds and components, including seawalls, boat hulls and the like; medical apparatuses and other applications; scaffolding and other building construction articles; sea containers; railroad containers; composite wheels for trains and vehicles; children's toys; military applications such as floating bridges and personnel transport vehicle components; playground equipment; aerospace applications; roofing components; rot-free lumber and decking without arsenic; farming and agricultural applications; industrial machinery pads; dunnage; and food shipping containers including food containers of all sizes and shapes, just to name some of the applications. Each of these applications will include various forms of the plastic articles, including various materials sandwiched between two or more skins in order to produce the desired material properties.

A. Pick-Up Truck Bed Box

A pick-up truck bed box is disclosed which includes two outer skins and an expandable plastic therebetween, with reinforcing screens and cones for structural strength as shown in the Figures. The preferred production method is the "tipping" method described hereinabove. The pick-up truck bed box is one of the preferred embodiments of the present invention and is manufactured pursuant to the method disclosed hereinabove with reference to FIG. 5, among others. This is a configuration which utilizes two complementary male and female exterior skins, having an inner portion of expandable or low density foam plastic. In addition to the filled skins, two pre-formed steel wire mesh grid reinforcements are embedded and surrounded within the low density foamed inner plastic center. These steel wire mesh grid reinforcements have been made of a welded mesh configuration that has been previously powder coated to aid in adhesion. The mesh reinforcements have been pre-formed to be shaped like each of the male and female molds, and are therefore easy to drop into or onto their respective molds prior to holding the molds together to effect the foaming of the center plastic. Wire mesh cone reinforcements are also incorporated at strategic locations to further enhance the strength of the resulting article. The reinforcements can easily be placed by robots once the skins of plastic have been melted onto the male and female molds and the excess plastic particulate has been removed. Then the two heated and skinned molds can be brought together, one resting on the other, and the residual heat from the molds will make the expandable foam plastic expand until it reaches the two outer skins, thereby embedding and encapsulating the two wire mesh reinforcements and the cone reinforcements forever in place within the truck bed box.

B. Industrial Tabletops

An industrial tabletop is disclosed which utilizes two polyethylene skins with an expandable plastic, reinforced with a metal mesh screen, or not, to form a table top which is commonly used as a banquet table for catering in hotels, restaurants and the like. Such an industrial tabletop made in accordance with the methods, processes and apparatuses of the present invention would be made by complementary male and female molds which can be used to form plastic skins of any suitable polyolefin, such as high density polyethylene, with an expanded plastic center. The expandable plastic is preferably the low density polyethylene foamable plastic from Equistar Corporation of Cincinnati, Ohio. Depending upon the usage of the tabletop, whether it be a hotel banquet table, or a medical table, the weight requirements may necessitate the use of an optional metal mesh matrix insert/reinforcement to be placed in the middle of the two skins. Table leg mounting portions such as mounting rails, may be inserted into the mold such that certain portions of the mounting rails extend outwardly from the molded article, such that table legs can be easily attached. This yields a strong yet lightweight tabletop, one which will easily attach to table legs. In addition, the tabletop can have a surface texture formed directly into the mold, and various colors of plastic can be used to simulate wood, stone, or any other desirable look for the top.

C. Airplane Cockpit Doors

An airplane cockpit door may be made from the present invention, utilizing a double skin configuration with an energy dispersive expandable foam, preferably containing sheets of Kevlar in the middle of the layers, to render the doors bulletproof, and to prevent a hijacker from kicking down the door. Steel mesh reinforcements may be utilized to provide the necessary strength, while allowing the entire configuration to be lightweight enough for use on an airplane. Similar to the pick up truck box configuration, there are two skins with an expandable foam plastic center having at least a Kevlar sheet embedded into the foam plastic center to render it bulletproof. Steel reinforcing inserts may be utilized around the door latch and hinges to add strength against someone trying to get into the cockpit of the plane. The Kevlar sheet may be coated with a fine layer of plastic or resin prior to its insertion in order to prevent it from shearing out of the plastic foamed center during impact. Furthermore, the Kevlar material can be permanently attached to a steel mesh cage which can be incorporated into the center of the cockpit door composition, to prevent it from coming loose during impact, such as when it is fired on by a bullet. Other inserts and reinforcements may be necessary in order to form an entirely useful airplane cockpit door.

D. Modular Housing Panels and Components

Modular housing panels can easily be manufactured using the present invention incorporating a double skin configuration with insulative materials in the expandable plastic portion of the panels. The expandable plastic center portion can be mixed with sawdust, foam beads, hollow spheres of plastic, or any other suitable insulating material that can withstand the heat from the expansion of the foamable plastic center, while retaining its insulating properties. When the panels are clipped or caulked together, the insulating properties of the filler material yield a home that is resistant to winter temperatures outside. It is envisioned that standard sizes and shapes of the panels could be molded to create a standard three to four meter wide box ready to have floor and roof sections attached thereto. There are also T-shaped connectors and L-shaped connectors in order to fit the panels together into desirable configurations. The panels may have a single set of electrical wires embedded therein, or they may have a conduit running vertically and one running horizontally to thread the necessary electrical wires therethrough. Electric lights could be mounted or attached to the vertical conduit, while the supply and ground wires could be threaded horizontally to an electric source outside the "house", whether it be to a generator or a source of electricity. The panels can be molded into log-like strips as well. They can be made to snap together and then caulked to form an "instant" house. This will be most useful for wartime refugees entering into cold countries. Instead of setting up tents, these panels can be snapped together. The wiring for electricity can be embedded right into the panels, so that they can have instant electricity for warmth and food preparation. Recreational use for "camping" can also be envisioned.

E. Material Handling Pallets

Pallets used in industrial material handling are made with a double skin configuration, with an expandable reinforced core, preferably including metal cone structures to make a very durable, lightweight, and inexpensive pallet that can be made with recycled materials.

The other applications are too numerous to mention in detail here, although it must be stated that various combinations and permutations of the present invention may be utilized for all the applications mentioned, as well as for ones which were not mentioned. The present invention may be incorporated into the manufacture of so many articles, it would be impossible to list them all here.

INDUSTRIAL APPLICABILITY

This invention finds industrial applicability in the formation of various articles from plastic particulate materials. It is especially useful in the manufacture of automotive components, modular housing panels, industrial tabletops and furniture, and airplane components.

What is claimed is:

1. A process for forming a plastic composite into a predetermined shape from a plastic particulate material and an expandable plastic filler material, each plastic material having a respective melting point, said process comprising the steps of:

providing open face complementary open molds made of a material selected from the group consisting of alloys, metals, ceramics, cermets, plastics, and combinations thereof, said open molds being formed into a predetermined shape with at least an open face portion on each of said complementary molds to impart a desired shape;

heating at least the face portions of the complementary open molds to an elevated temperature of from about 100° C. to about 865° C. which is above the melting points of the respective plastic particulate material and the plastic filler material;

contacting the open face portion of the complementary open molds with the plastic particulate material resulting in two melted plastic skins on the surfaces of the open molds, said contacting occurring while the plastic particulate is at least at room temperature for a dwell time period of from about 1 second to about 30 minutes, said dwell time period being pre-selected to melt the plastic particulate into a molded skin of a plastic article having a skin of a desired thickness of from about 0.001 cm to about 3.0 cm prior to ceasing contact with the plastic particulate, and removing the excess plastic particulate to leave a molded skin of the desired thickness in the open mold;

contacting the plastic skin on the face portion of at least one of the open face complementary open molds with the expandable plastic filler material;

bringing together the complementary face portions of the heated open molds to adhere the two skins of plastic articles to each other such that an article is formed having a molded surface on both sides.

2. The process of claim 1, further comprising a step of placing a reinforcement between said open molds prior to the step of bringing together the open molds and adhering the skins together.

3. The process of claim 1, wherein the plastic particulate at least at room temperature is at an elevated temperature under the melting point of the plastic particulate.

4. The process of claim 1, wherein said heating of the molds is accomplished by heating them to an elevated temperature of from about 160° C. to about 220° C.

5. The process of claim 1, wherein the dwell time period is from about three minutes to about 10 minutes.

6. The process of claim 1, wherein the step of bringing together the open molds is accomplished by spacing them apart.

7. A process for forming a plastic composite into a predetermined shape from a plastic particulate material and an expandable plastic filler material, each plastic material having a respective melting point, said process comprising:

providing open face complementary open molds made of a material selected from the group consisting of alloys, metals, ceramics, cermets, plastics, and combinations thereof, said molds being formed into a predetermined shape with at least an open face portion on each of said open complementary molds to impart the desired shape;

heating at least the open face portions of the complementary open molds to an elevated temperature of from about 130° C. to about 865° C. which is above the melting points of the respective plastic particulate material and the plastic filler material;

contacting the face portions of the complementary open molds to the plastic particulate material resulting in two melted plastic skin layers on the open face surfaces of the open molds, said contacting occurring while the plastic particulate is at least at room temperature for a dwell time period of from about 1 second to about 30 minutes, said dwell time period being pre-selected to melt the plastic particulate into a layer of a desired thickness prior to ceasing contact with the plastic particulate, and removing the excess plastic particulate to leave a molded skin of the desired thickness in the open mold;

contacting the skin layer on the face portion of at least one of the open face complementary open molds with the expandable plastic filler material;

holding together while spacing apart the two complementary open molds from one another at a predetermined distance such that the expandable plastic filler material may be sandwiched between the molds to form a double skinned composite with a plastic filler material in the middle of the two skins, with an overall predetermined thickness of the composite; and cooling at least one of the complementary molds to loosen and remove the article.

8. The process of claim 7, wherein the step of heating the molds is accomplished by elevating the temperature to about 160° C. to about 220° C.

9. The process of claim 7, further comprising a step of placing a reinforcement between said open molds prior to the step of bringing together the open molds and adhering the skins together.

10. The process of claim 7, further comprising inserting an expandable plastic filler material between the heated molds after the skins have been formed to form an expanded plastic center.

11. A process for forming a plastic composite into a predetermined shape from a plastic particulate material and an expandable plastic filler material, each having a respective melting point, said process comprising:

providing open face complementary open molds made of a material selected from the group consisting of alloys, metals, ceramics, cermets, plastics, and combinations thereof, said molds being formed into a predetermined shape with at least an open face portion on each of said complementary open molds to impart a desired shape;

providing a means for heating the open face complementary open molds to an elevated temperature of from about 100° C. to about 865° C. which is above the melting points of the respective plastic particulate material and the expandable plastic filler material, such that contacting the complementary molds to the plastic particulate material will result in a melted plastic layer on the surface contacted;

heating said complementary open molds by said heating means at least on their open face portions to a temperature above the melting point of the plastic particulate, and then contacting the face portion of the two molds with the plastic particulate while the plastic particulate is at least at room temperature for a dwell time period preselected to melt the plastic particulate into a skin layer of a desired thickness on the face portion, prior to ceasing contact with the plastic particulate; and holding the two open face complementary open molds apart from one another at a predetermined distance and placing expandable plastic filler material between the two heated complementary molds such that the expandable plastic filler material is sandwiched and expanded between the molds to a thickness determined by the distance the molds are spaced apart.

12. The process of claim 7, further comprising a step of placing a reinforcement between said complementary open molds prior to the step of bringing together the molds and adhering the skins together.

* * * * *